(12) United States Patent
Shabtay et al.

(10) Patent No.: US 11,567,305 B2
(45) Date of Patent: Jan. 31, 2023

(54) ZOOM DUAL-APERTURE CAMERA WITH FOLDED LENS

(71) Applicant: Corephotonics Ltd., Tel Aviv (IL)

(72) Inventors: Gal Shabtay, Tel Aviv (IL); Ephraim Goldenberg, Tel Aviv (IL); Gal Avivi, Tel Aviv (IL); Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/878,281

(22) Filed: Aug. 1, 2022

(65) Prior Publication Data

US 2022/0382024 A1 Dec. 1, 2022

Related U.S. Application Data

(63) Continuation of application No. 17/577,430, filed on Jan. 18, 2022, which is a continuation of application No. 17/126,266, filed on Dec. 18, 2020, now Pat. No. 11,262,559, which is a continuation of application No. 16/664,841, filed on Oct. 26, 2019, now Pat. No. 10,976,527, which is a continuation of application No. 16/402,412, filed on May 3, 2019, now Pat. No. 10,509,209, which is a continuation of application No. 16/172,761, filed on Oct. 27, 2018, now Pat. No. 10,571,665, which is a continuation of application No. 15/820,917, filed on Nov. 22, 2017, now Pat. No.
(Continued)

(51) Int. Cl.
| | | |
|---|---|---|
| *H04N 5/225* | (2006.01) |
| *G02B 13/00* | (2006.01) |
| *H04N 5/247* | (2006.01) |
| *G02B 13/02* | (2006.01) |
| *G02B 7/09* | (2021.01) |
| *G02B 7/10* | (2021.01) |
| *H04N 5/232* | (2006.01) |
| *G02B 13/04* | (2006.01) |

(52) U.S. Cl.
CPC .......... *G02B 13/0065* (2013.01); *G02B 7/09* (2013.01); *G02B 7/102* (2013.01); *G02B 13/009* (2013.01); *G02B 13/02* (2013.01); *G02B 13/04* (2013.01); *H04N 5/2253* (2013.01); *H04N 5/2254* (2013.01); *H04N 5/2257* (2013.01); *H04N 5/2258* (2013.01); *H04N 5/23212* (2013.01); *H04N 5/247* (2013.01)

(58) Field of Classification Search
CPC ...... G02B 13/0065; G02B 7/09; G02B 7/102; G02B 13/009; G02B 13/02; G02B 13/04; H04N 5/2253; H04N 5/2254; H04N 5/2257; H04N 5/2258; H04N 5/23212; H04N 5/247
See application file for complete search history.

(56) References Cited

U.S. PATENT DOCUMENTS

| | | | | |
|---|---|---|---|---|
| 2014/0300799 | A1* | 10/2014 | Yoshino | H04N 5/23212 |
| | | | | 348/347 |
| 2015/0070783 | A1* | 3/2015 | Hashimoto | G06T 5/002 |
| | | | | 359/708 |
| 2016/0381260 | A1* | 12/2016 | Narayanswamy | H04N 5/2257 |
| | | | | 348/360 |

* cited by examiner

*Primary Examiner* — Mekonnen D Dagnew
(74) *Attorney, Agent, or Firm* — Nathan & Associates; Menachem Nathan

(57) ABSTRACT

Zoom digital cameras comprising a Wide sub-camera and a folded fixed Tele sub-camera. The folded Tele sub-camera may be auto-focused by moving either its lens or a reflecting element inserted in an optical path between its lens and a respective image sensor. The folded Tele sub-camera is configured to have a low profile to enable its integration within a portable electronic device.

22 Claims, 15 Drawing Sheets

Related U.S. Application Data

10,156,706, which is a continuation of application No. 15/177,688, filed on Jun. 9, 2016, now Pat. No. 9,829,684, which is a continuation of application No. 14/717,258, filed on May 20, 2015, now Pat. No. 9,392,188, which is a continuation-in-part of application No. 14/455,906, filed on Aug. 10, 2014, now abandoned.

Sub-camera 1
Sub-camera 2

ZOOM DUAL-APERTURE CAMERA WITH FOLDED LENS

CROSS REFERENCE TO RELATED APPLICATIONS

This application is a continuation of U.S. patent application Ser. No. 17/577,430 filed Jan. 18, 2022 (now allowed), which was a continuation of U.S. patent application Ser. No. 17/126,266 filed Dec. 18, 2020 (now U.S. Pat. No. 11,262,559), which was a continuation of U.S. patent application Ser. No. 16/664,841 filed Oct. 26, 2019 (now U.S. Pat. No. 10,976,527), which was a continuation of U.S. patent application Ser. No. 16/402,412 filed May 3, 2019 (now U.S. Pat. No. 10,509,209), which was a continuation of U.S. patent application Ser. No. 16/172,761 filed Oct. 27, 2018 (now U.S. Pat. No. 10,571,665), which was a continuation of U.S. patent application Ser. No. 15/820,917 filed Nov. 22, 2017 (now U.S. Pat. No. 10,156,706), which was a continuation of U.S. patent application Ser. No. 15/177,688 filed Jun. 9, 2016 (now U.S. Pat. No. 9,829,684), which was a continuation of U.S. patent application Ser. No. 14/717,258 filed May 20, 2015 (now U.S. Pat. No. 9,392,188), which was a continuation-in-part of U.S. patent application Ser. No. 14/455,906 filed Aug. 10, 2014 (abandoned).

FIELD

The presently disclosed subject matter is generally related to the field of digital cameras, and in particular to multiple-aperture digital cameras.

BACKGROUND

In recent years, mobile devices such as cell-phones (and in particular Smartphones), tablets and laptops have become ubiquitous. Such devices commonly include one or two compact digital cameras e.g. a main rear-facing camera (i.e. a camera on the back side of the device, facing away from the user and often used for casual photography) and a secondary front-facing camera (i.e. a camera located on the front side of the device and often used for video conferencing).

The design of many of these cameras is similar to the traditional structure of a digital still camera, i.e. they comprise an optical component (or a train of several optical elements and a main aperture) placed on top of an image sensor (also referred to henceforth simply as "sensor"). The optical component (also referred to as "optics") refracts the incoming light rays and bends them to create an image of a scene on the sensor.

The dimensions of these cameras are largely determined by the size of the sensor and by the height of the optics. These are usually tied together through the focal length (f) of the lens and its field of view (FOV)—a lens that has to image a certain FOV on a sensor of a certain size has a specific focal length. Keeping the FOV constant, the larger the sensor dimensions (e.g. in an X-Y plane), the larger the focal length and the optics height.

As the dimensions of mobile devices (and in particular the thickness of devices such as Smartphones) are constantly being diminished, compact camera dimensions are becoming an increasingly limiting factor on device thickness. Several approaches have been proposed to reduce compact camera thickness in order to alleviate this constraint. Recently, multi-aperture systems have been proposed for this purpose. In such systems, instead of having one aperture with one train of optical elements, the camera is divided into several apertures, each with dedicated optical elements, and all sharing a similar field of view. Hereinafter, each such aperture, together with the optics and the sensor area on which the image is formed, is defined as a "sub-camera". Images from the sub-cameras are fused together to create a single output image.

In some multi-aperture camera designs, each sub-camera creates a smaller image on the image sensor compared with the image created by a reference single-aperture camera. Therefore, the height of each sub-camera can be smaller than the height of a single-aperture camera, reducing the total height of the camera and allowing for slimmer designs of mobile devices.

Dual-aperture zoom cameras in which one sub-camera has a wide FOV ("Wide sub-camera") and the other has a narrow FOV ("Tele sub-camera") are known. One problem with dual-aperture zoom cameras relates to the height of the zoom Tele sub-camera. There is a significant difference in the height (also known as "total track length" or "TTL") of Tele ("T") and Wide ("W") sub-cameras. The TTL is typically defined as the maximal distance between the object-side surface of a first lens element and a camera image sensor plane. In most miniature lenses, the TTL is larger than the lens effective focal length (EFL). A typical TTL/EFL ratio for a given lens (or lens unit) is around 1.3. In a single-aperture Smartphone camera with a ⅓-¼" sensor, EFL is typically between 3.5 and 4.5 mm, respectively, leading to a FOV of 70-80°.

Assuming, for example, one wishes to achieve a dual-aperture ×2 optical zoom in a Smartphone, it would be natural to use $EFL_W=3.5$ mm and $EFL_T=2\times EFL_W=7$ mm. However, without spatial restrictions, the Wide lens will have an $EFL_W=3.5$ mm and a $TTL_W$ of $3.5\times 1.3=4.55$ mm, while the Tele lens will have $EFL_T=7$ mm and $TTL_T$ of $7\times 1.3=9.1$ mm. The incorporation of a 9.1 mm lens in a Smartphone camera would lead to a camera height of around 10 mm, which is unacceptable for many Smartphone manufacturers.

An example of a solution to the aforementioned problem is described in co-invented and co-owned PCT patent application PCT/IB2014/062180 titled "Dual-aperture zoom digital camera" (published as WO2014/199338). Some of the principles of this solution are shown in FIGS. 1A and 1B hereof schematically illustrating an embodiment of a dual-aperture zoom camera with auto-focus (AF) and numbered 100, in FIG. 1A, a general isometric view, and, in FIG. 1B, a sectioned isometric view. Camera 100 comprises two sub-cameras, labeled 102 and 104, each sub-camera having its own optics. Thus, sub-camera 102 includes an optics bloc 106 with an aperture 108 and an optical lens module 110, as well as a sensor 112. Similarly, sub-camera 104 includes an optics bloc 114 with an aperture 116 and an optical lens module 118, as well as a sensor 120. Each optical lens module may include several lens elements as well as an Infra-Red (IR) filter 122a and 122b. Optionally, some or all of the lens elements belonging to different apertures may be formed on the same substrate. The two sub-cameras are positioned next to each other, with a small baseline in the 124 between the center of the two apertures 108 and 116. Each sub-camera can further include an AF mechanism, respectively 126 and 128, controlled by a controller (not shown). Camera 100 is "thin" as expressed by TTL/EFL for each sub-camera. Typically, $TTL_W/EFL_W>1.1$ and $TTL_T/EFL_T<1.0$ (e.g. 0.85).

While the zoom range in camera 100 is about ×2, it would be advantageous to further increase this range. However, this requires increasing further the Tele lens EFL (EFL$_T$), which will cause an increase in the camera height. An increase of EFL$_T$ to exemplarily 12 mm will result in an undesirable camera height of for example 0.85×12+0.9=11.1 mm.

General Description

As noted above, the requirements for digital cameras for use in portable electronic devices are related to the dimensions and image quality of the camera. Moreover, these requirements become more essential when the camera is to be installed within the portable device, unlike other external camera units attachable to the portable device.

In the case of an internal (integral) camera unit, a camera is required to have dimensions as small as possible in order to fit the thickness of the device in which the camera is installed (preferably without protruding from the device's casing), while being suitable to operate with commonly used image sensors. This problem is even more crucial when using a Tele lens with a long effective focal length (EFL) to obtain a relatively high zooming effect.

Thus, according to one aspect of the presently disclosed subject matter, there is provided a zoom digital camera comprising a Wide sub-camera and a Tele sub-camera. The Wide sub-camera comprises a Wide lens module and a Wide image sensor, the Wide lens module having a Wide lens symmetry axis along a first optical path between an object side and the Wide image sensor. The Wide sub-camera is configured to provide a Wide image.

The Tele sub-camera comprises a Tele lens module and a Tele image sensor and a first reflecting element. The Tele lens module has a Tele lens symmetry axis along a second optical path, the Tele lens symmetry axis positioned substantially perpendicular to the Wide lens symmetry axis. The Tele sub-camera is configured to provide a Tele image.

The first reflecting element has a first reflecting element symmetry axis inclined substantially at 45 degrees to both the Wide lens symmetry axis and the Tele lens symmetry axis and is operative to provide a folded optical path between the object and the Tele image sensor. Accordingly, the Tele sub-camera is considered to be folded and is referred to herein as "folded Tele sub-camera".

The Wide lens has a Wide field of view (FOV$_W$) and the Tele lens has a Tele field of view (FOV$_T$) narrower than FOV$_W$. According to one non-limiting example, the Tele sub-camera provides an ×5 zooming effect, compared to the Wide sub-camera.

The digital camera is operatively connected to at least one image processor configured to process the Tele image and the Wide image into an output image. Methods of fusing images received through different optical paths into a single output image are provided for example in co-invented and co-owned PCT patent application, publication no. WO2014/083489 titled "HIGH-RESOLUTION THIN MULTI-APERTURE IMAGING SYSTEMS", and co-invented and co-owned U.S. patent application Ser. No. 14/365,711 titled "DUAL APERTURE ZOOM DIGITAL CAMERA" which are incorporated herein by reference and discloses a multi-aperture imaging system comprising a first camera with a first sensor that captures a first image, and a second camera with a second sensor that captures a second image. Either image may be chosen to be a primary or an auxiliary image, based on a zoom factor. An output image with a point of view determined by the primary image is obtained by registering the auxiliary image to the primary image.

In order to further adapt the dimensions of the folded Tele sub-camera to the trend in electronic portable devices, seeking to reduce their thickness as much as possible, various features of the folded Tele sub-camera were specifically configured to enable to achieve a folded Tele sub-camera with reduced height. Reduction of the Tele-sub camera height enables to reduce the overall height of a dual aperture camera. Furthermore, reduction of the folded Tele sub-camera height was achieved while maintaining a desirable image quality.

Thus, in addition to the above features, according to various examples of the presently disclosed subject matter, the zoom digital camera can comprise one or more of features (1) to (32) below, in any desired combination and permutation.

1) wherein the Tele lens module of the folded Tele sub-camera comprises a group of at least 3 lens elements and wherein the lens elements in the group are designed to have a diameter substantially not exceeding the diameter of an aperture of the Tele sub-camera. As explained below, this is different than conventional lens modules where the diameters of the lenses are designed to be increasingly wider towards the sensor.

2) wherein the Tele lens module of the folded Tele sub-camera comprises a group of 3 to 5 lens elements.

3) wherein the Tele sub-camera further comprises a substrate, a structure for holding the lens elements in place, and a camera casing.

4) wherein the aperture of the Tele sub-camera is designed to provide a sufficiently low F # (e.g. equal or smaller than 3) to increase light falling on the Tele image sensor.

5) wherein the Tele lens module is designed to enable to generate an image on an entire area of the Tele image sensor. The Tele image sensor can be for example a ⅓" image sensor or a ¼" image sensor.

6) wherein the lens elements in the group are designed such that blocked light does not exceed a certain percentage of the light entering the Tele lens module (e.g. not more than 25% of light entering the Tele lens module is blocked).

7) wherein according to one example the Tele sub-camera is configured to have the following technical parameters: an EFL>9 mm, an F #<3 and light blockage does not exceed more than 25% of light entering the Tele sub-camera aperture for all viewing angles.

8) wherein the Tele sub-camera is characterized by a height not exceeding 6.5 mm.

9) wherein the Tele sub-camera is characterized by a height not exceeding 5.7 mm.

10) wherein the Tele image sensor lies in a plane substantially perpendicular to the Tele lens symmetry axis.

11) wherein the Tele sub-camera comprises a Tele auto-focus (AF) mechanism configured to move the Tele lens along the Tele symmetry axis; the AF mechanism is designed such that its height substantially does not exceed the height of a Tele lens module.

12) wherein the AF mechanism comprises one or more magnets coupled to respective coils, positioned laterally on one or two sides of the Tele lens module, the magnets having a height substantially not exceeding the height of the Tele lens module.

13) wherein the AF mechanism comprises only one magnet coupled to a respective coil.

14) wherein the camera further comprises a second reflecting element positioned in the second optical path between the Tele lens module and the Tele image sensor, the second reflecting element being configured to direct light that propagates parallel to the second optical path to the first optical path, wherein the Tele image sensor lies in a plane substantially perpendicular to the Wide lens symmetry axis.

15) wherein the camera further comprises a Tele autofocus (AF) mechanism configured to move the second reflecting element along a second reflecting element symmetry axis.

16) wherein the Wide and Tele image sensors are mounted on a single printed circuit board.

17) wherein at least one processor operatively connected to the camera is configured to use a zoom factor (ZF) to determine a respective output field of view.

18) wherein the Wide lens module has a Wide field of view $FOV_W$ and the Tele lens module has a Tele field of view $FOV_T$ narrower than $FOV_W$; the camera further comprises a Mid sub-camera that includes a Mid lens module with a field of view $FOV_M$ that fulfills $FOV_W > FOV_M > FOV_T$ and a Mid image sensor, the Mid lens having a Mid lens symmetry axis; the Mid camera is configured to provide a Mid image.

19) wherein the Mid sub-camera is configured with an EFL which equals to a geometric average of an EFL of the Wide sub-camera and an EFL of the Tele sub-camera.

20) wherein at least one processor operatively connected to the camera is configured to process the Mid image together with the Tele image or the Wide image into an output image.

21) wherein the Mid lens symmetry axis is substantially perpendicular to the Wide lens symmetry axis and the Mid image sensor lies in a plane substantially perpendicular to the Mid lens symmetry axis; and wherein the Tele image sensor lies in a plane substantially perpendicular to the Tele lens symmetry axis.

22) wherein the camera further comprises a Mid autofocus (AF) mechanism configured to move the Mid lens module along the Mid symmetry axis, which is substantially perpendicular to the Wide lens symmetry axis; and a Tele AF mechanism configured to move the Tele lens module along the Tele symmetry axis; either of the Mid AF mechanism and Tele AF mechanism have a height substantially not exceeding the height of the Tele lens module.

23) wherein the Mid AF mechanism comprises one or more magnets coupled to respective coils, positioned laterally on one or two sides of the Tele lens module, the magnets having a height substantially not exceeding the height of the Tele lens module.

24) wherein the Mid AF mechanism comprises only one magnet coupled to a respective coil.

25) wherein the camera further comprises a third reflecting element inclined substantially at 45 degrees to both the Wide lens symmetry axis and the Mid lens symmetry axis; the third reflecting element is configured to provide a folded optical path between the object side and the Mid image sensor.

26) wherein the camera further comprises a fourth reflecting element positioned in a fourth optical path between the Mid lens and the Mid image sensor, the fourth reflecting element configured to direct light that propagates parallel to the second optical path to the first optical path, wherein the Mid image sensor lies in a plane substantially parallel to the Mid lens symmetry axis.

27) wherein the camera further comprises a Mid autofocus (AF) mechanism configured to move the fourth reflecting element along a fourth reflecting element symmetry axis.

28) wherein a Mid lens symmetry axis of the Mid sub-camera is substantially parallel to the Wide lens symmetry axis and the Wide and Mid image sensors are mounted on a single printed circuit board.

29) wherein a Mid lens symmetry axis of the Mid sub-camera is substantially perpendicular to the Wide lens symmetry axis and the Wide and Mid image sensors are mounted on a single printed circuit board.

30) wherein at least one processor operatively connected to the camera is configured to use a zoom factor (ZF) to determine a respective output field of view.

31) wherein at least one processor operatively connected to the camera is configured to output an output image formed by using Wide and Mid images for a ZF that sets a FOV between $FOV_W$ and $FOV_M$.

32) wherein at least one processor operatively connected to the camera is configured to output an output image formed by using Mid and Tele images for a ZF that sets a FOV between $FOV_M$ and $FOV_T$.

According to one example, the presently disclosed subject matter includes a digital camera configured to be integrated within a casing of an electronic device, the camera comprising: a Wide sub-camera, a Tele sub-camera and a Tele auto-focus (AF) mechanism;

the Wide sub-camera comprising, a Wide lens module and a Wide image sensor, the Wide lens module having a Wide lens symmetry axis along a first optical path between an object side and the Wide image sensor; the Wide sub-camera configured to provide a Wide image; a Tele sub-camera comprising, a Tele lens module and a Tele image sensor and a first mirror; the Tele lens module having a Tele lens symmetry axis along a second optical path, the Tele lens symmetry axis positioned substantially perpendicular to the Wide lens symmetry axis; the Tele camera is configured to provide a Tele image; the first mirror has a first mirror symmetry axis inclined substantially at 45 degrees to both the Wide lens symmetry axis and the Tele lens symmetry axis and is operative to provide a folded optical path between the object and the Tele image sensor;

wherein the Tele lens module comprises a group of 3 to 5 lens elements and wherein the lens elements in the group are designed to have a diameter substantially not exceeding the diameter of an aperture of the Tele sub-camera, to enable the generation of an image on an entire area of the Tele image sensor, and to enable passage of at least 75% of light entering the Tele lens module, towards the Tele image sensor;

wherein the Tele AF mechanism is configured to move the Tele lens along the Tele symmetry axis; the AF mechanism comprises one or more magnets coupled to respective coils, positioned laterally on one or two sides of to the Tele lens module, the magnets having a height substantially not exceeding the height of the Tele lens module.

The presently disclosed subject matter further contemplates a mobile electronic device such as a cell phone (e.g. Smartphone), portable computer, notepad, tablet, watch, any type of electronic wearable device (e.g. bracelet, watch, helmet, glasses, etc.), or the like, which is equipped with a digital camera as disclosed herein. According to some examples, the digital camera is fully integrated within the electronic device (i.e. without protruding from the casing of the electronic device).

The presently disclosed subject matter further contemplates a Folded Tele sub-camera having a low camera profile as disclosed above.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by the same numerals.

FIGS. 9A, 9B and 9C show graphs illustrating in: (FIG. 9A) user experience of resolution gain vs. zoom factor in an ideal continuous zoom; (FIG. 9B) user experience of resolution gain vs. zoom factor with a camera that includes two, Wide and Tele sub-cameras with 13 Mega pixel sensors and a 2 Mega pixel viewer; and (FIG. 9C) user experience of resolution gain vs. zoom factor with a camera that includes three, Wide, Mid and Tele sub-cameras with 13 Mega pixel sensors and a 2 Mega pixel viewer, according to an example of the presently disclosed subject matter;

DETAILED DESCRIPTION

It is to be understood that when specific direction and/or angle values are given herein, they are meant to include a range of values acceptable within practical tolerances known in the pertinent field.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value. The specified value can be absolute value (e.g. substantially not exceeding 45°, substantially perpendicular, etc.) or relative (e.g. substantially not exceeding the height of x, etc.).

It is noted, that in the current discussion "aperture diameter" refers to diameter of an aperture in a camera with a constant aperture size or to the maximal aperture diameter in a camera with a variable aperture size.

As used herein, the phrase "for example," "such as", "for instance", "in an embodiment" and variants thereof describe non-limiting examples of the presently disclosed subject matter. It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It is noted that the term "optic bloc" as used herein refers to the lens module together with the auto focus mechanism.

Figure 2A:
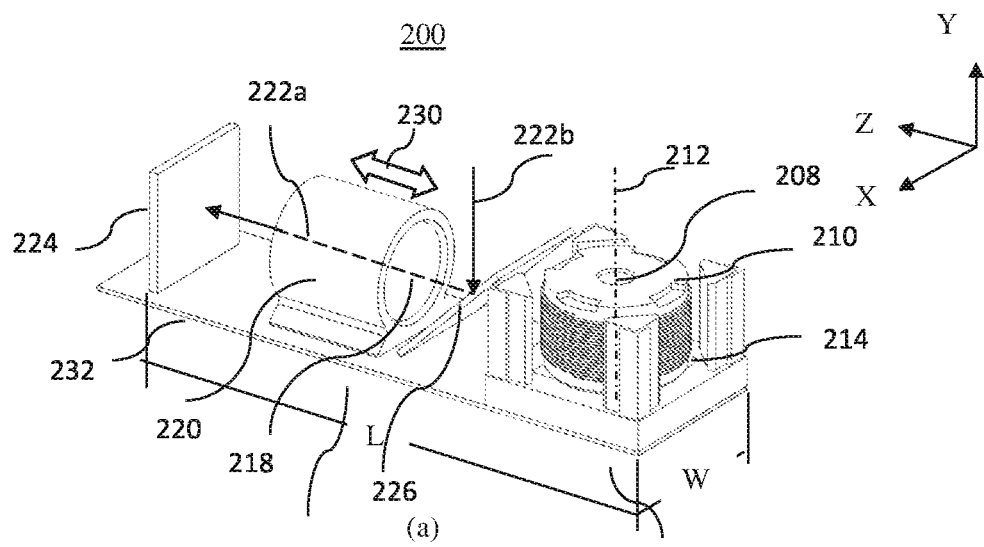
FIGS. 2A and 2B show schematically a zoom and auto-focus dual-aperture camera with folded Tele lens module in (FIG. 2A) a general isometric view, and (FIG. 2B) a side view, according to an example of the presently disclosed subject matter.
Figure 2B:
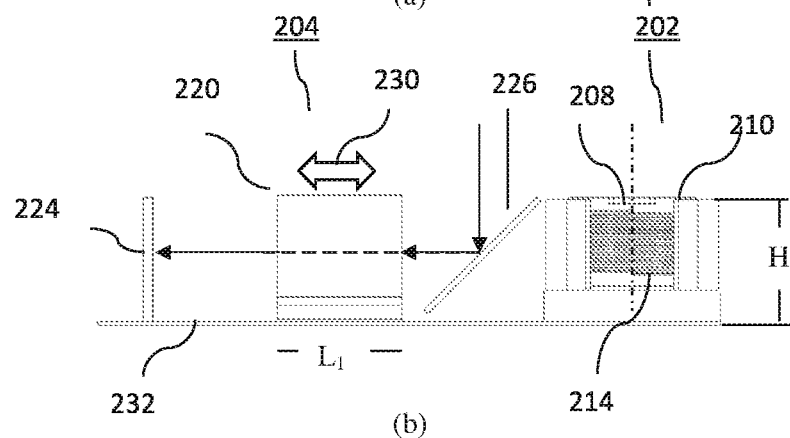

Turning now to FIGS. 2A and 2B, it shows schematically an embodiment of a zoom and auto-focus dual-aperture camera 200 with folded Tele lens disclosed herein in (FIG. 2A) a general isometric view and (FIG. 2B) a sectioned isometric view. The isometric view is shown related to a XYZ coordinate system. Camera 200 comprises two sub-cameras, a regular Wide sub-camera 202 and a Tele sub-camera 204.

Wide camera 202 includes a Wide optics bloc with a respective aperture 208 (indicating object side of the camera) and an optical lens module 210 (or "lens module" in short) with a symmetry (and optical) axis 212 in the Y direction, as well as a Wide image sensor 214. Tele camera 204 includes a Tele optics bloc with a respective aperture 218 and an optical lens module 220 with a Tele lens symmetry (and optical) axis 222a, as well as a Tele image sensor 224.

Camera 200 further comprises a first flat reflecting element (e.g. mirror or prism) 226 inserted in a "Tele" optical path. The Tele optical path is extended from an object (not shown) through the Tele lens module (or simply "Tele lens") to the Tele sensor and marked by arrows 222b and 222a. Arrow 222b indicates the direction from the object side of the camera and is substantially parallel to symmetry axis 212 of the Wide sub-camera. For simplicity, hereinafter the reflective element is referred to as "mirror", however, this is by way of example only and should not be construed as limiting in any way.

According to one example, the Wide image sensor 214 lies in the X-Z plane, while the Tele image sensor lies a X-Y plane substantially perpendicular to the Tele lens symmetry axis 222a. Various camera elements may be mounted on a substrate 232, e.g. a printed circuit board (PCB). It may be said that the Tele sensor is "upright" as it lies in a plane substantially perpendicular to that of Wide sensor 214 and substrate 232.

Notably, using a Tele sub-camera with a Tele sensor in an upright position helps to reduce the length of the Tele sub camera and therefore reduces the overall camera footprint, as compared to a Tele sensor positioned in the X-Z plane, as described below with reference to FIGS. 3A and 3B.

According to one example, mirror 226 is inclined at substantially 45° to the Tele lens symmetry axis (222a) and to arrow 222b. The Tele optical path is thus "folded". Hereinafter, a Tele lens having a folded optical path passing therethrough is referred to as a "folded Tele lens" and a Tele sub-camera with such a folded lens is referred to as a "folded Tele sub-camera".

Figures 1A, 1B:
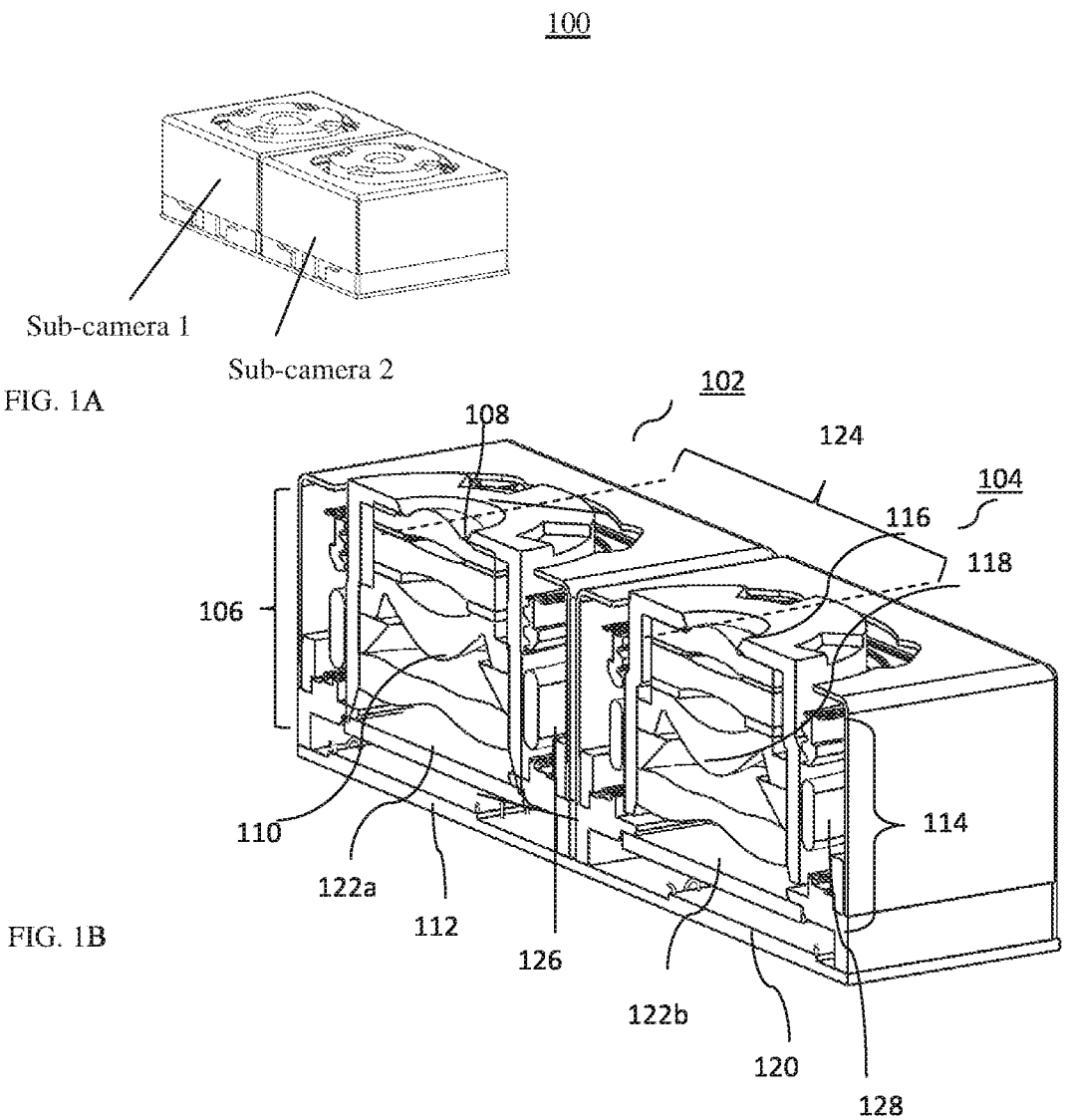
FIG. 1A shows schematically a general isometric view of the design of a dual-aperture camera with zoom and AF.
FIG. 1B shows schematically a sectioned isometric view of the design of a dual-aperture camera with zoom and AF.

Both Wide and Tele sub-cameras may be fixed focus (FF) or auto focus (AF). When present, an AF mechanism for the Wide camera is indicated generally by numeral 206, and in one example it can be similar to the mechanism shown in FIGS. 1A and 1B. A new, low profile AF mechanism is described below with reference to FIGS. 12A and 12B and FIGS. 13A and 13B.

If an AF mechanism is included in the Tele sub-camera, it is applied such that the auto-focus movement is along the Z axis. An AF mechanism may be coupled to and may be operative to move the Tele lens along the Z axis in a direction shown by an arrow 230, i.e. parallel to its symmetry axis 222a. The Tele lens movement range may be for example between 100-500 μm. Camera 200 can further include (or be otherwise operatively connected to) a processing unit comprising one or more suitably configured processors (not shown) for processing the Tele image and the Wide image into an output image.

The processing unit may include hardware (HW) and software (SW) specifically dedicated for operating with the digital camera. Alternatively, a processor of an electronic device (e.g. its native CPU) in which the camera is installed can be adapted for executing various processing operations related to the digital camera (including, but not limited to, processing the Tele image and the Wide image into an output image).

Camera 200 (as well as other cameras mentioned below) may have, according to some non-limiting examples, dimensions and/or parameters as shown in Table 1. These dimensions (given in millimeters) and parameters include a camera width W, a camera length L, a camera height H, a Wide sub-camera effective focal length $EFL_W$, a Wide F-number F #w, a Tele sub-camera effective focal length $EFL_T$ and a Tele F-number F #T.

TABLE 1

| FIG. | W | L | H | $EFL_W$ | $EFL_M$ | $EFL_T$ | $F\#_W$ | $F\#_M$ | $F\#_T$ |
|---|---|---|---|---|---|---|---|---|---|
| 2A&B | 5-12 | 20-50 | 4-8 | 2-8 |  | 5-25 | 2-3 |  | 2-5 |
| 2C | 10-25 | 10-40 | 4-8 | 2-8 |  | 5-25 | 2-3 |  | 2-5 |
| 3A&B | 5-12 | 20-50 | 4-8 | 2-8 |  | 5-25 | 2-3 |  | 2-5 |
| 4A&B | 5-12 | 20-50 | 4-8 | 2-8 |  | 5-25 | 2-3 |  | 2-5 |
| 6A | 5-12 | 25-60 | 4-8 | 2-5 | 4-10 | 8-30 | 2-3 | 2-3 | 2-5 |
| 6B | 5-12 | 20-50 | 4-8 | 2-5 | 4-10 | 8-30 | 2-3 | 2-3 | 2-5 |
| 6C | 10-25 | 10-40 | 4-8 | 2-5 | 4-10 | 8-30 | 2-3 | 2-3 | 2-5 |
| 7 | 5-12 | 25-60 | 4-8 | 2-5 | 4-10 | 8-30 | 2-3 | 2-3 | 2-5 |
| 8 | 10-25 | 20-50 | 4-8 | 2-8 | 4-20 | 8-30 | 2-3 | 2-5 | 2-5 |

For example, the folding of the Tele lens module in camera 200 (as well as in cameras 300-600 below) enables the use of a Tele lens module with an $EFL_T$ of 12 mm while maintaining the overall camera height significantly lower than the height of a camera utilizing a normal upright Tele lens with the same $EFL_T$ (e.g. 11.1 mm mentioned in the background section above).

In order to provide more clarity and avoid clutter in the following drawings, some elements similar to or identical to elements in camera 200 may be mentioned, but shown without reference numerals.

Figure 2C:
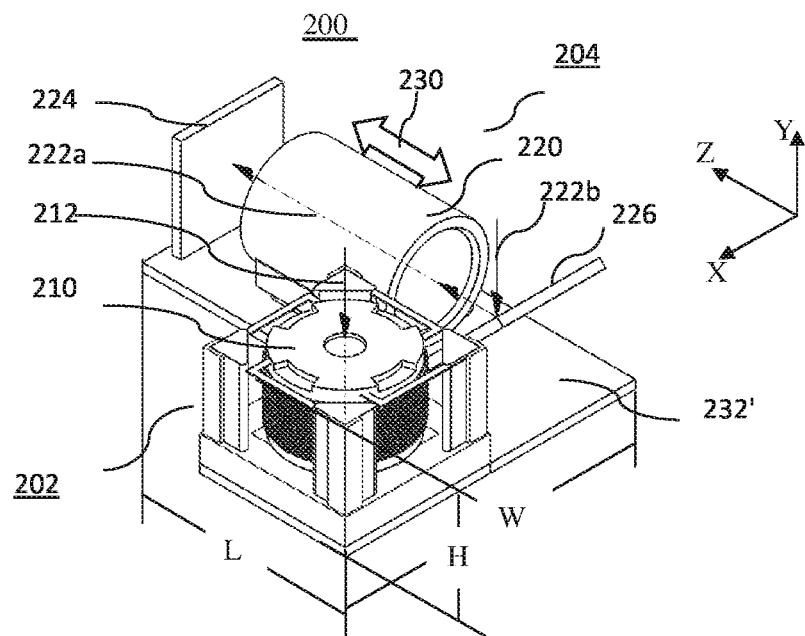
FIG. 2C shows schematically in a general isometric view a zoom and auto-focus dual-aperture camera with folded Tele lens module, according to an example of the presently disclosed subject matter.

FIG. 2C shows schematically, in a general isometric view, another embodiment of a zoom and auto-focus dual-aperture camera (200') with folded Tele lens module disclosed herein. Camera 200' includes essentially the same elements as camera 200, and such elements (when numbered) are numbered accordingly with the same numerals. The two cameras differ mainly in the relative positioning (e.g. on substrate 232') of the Tele and Wide sub-cameras and mirror 226.

As shown, these elements are arranged such that camera 200' has a "squarer" footprint than camera 200. In particular, a width W in camera 200' is larger than width W in camera 200, while a length L in camera 200' is smaller than L in camera 200. Note that the configuration shown, in which the Wide sub-camera's sides are parallel to respectively the X and Z axes while the Tele lens is essentially aligned along the Z axis, is shown by way of example only, and that in other embodiments each sub-camera may be positioned differently. For example, the Wide sub-camera may have sides not parallel to the X, Y axes and the Tele lens may be aligned in a different direction than Z, as long as the optical axis, before the folding, is parallel to the Wide camera symmetry axis. Camera 200' may have exemplary dimensions and/or parameters shown in Table 1.

Figure 3A:
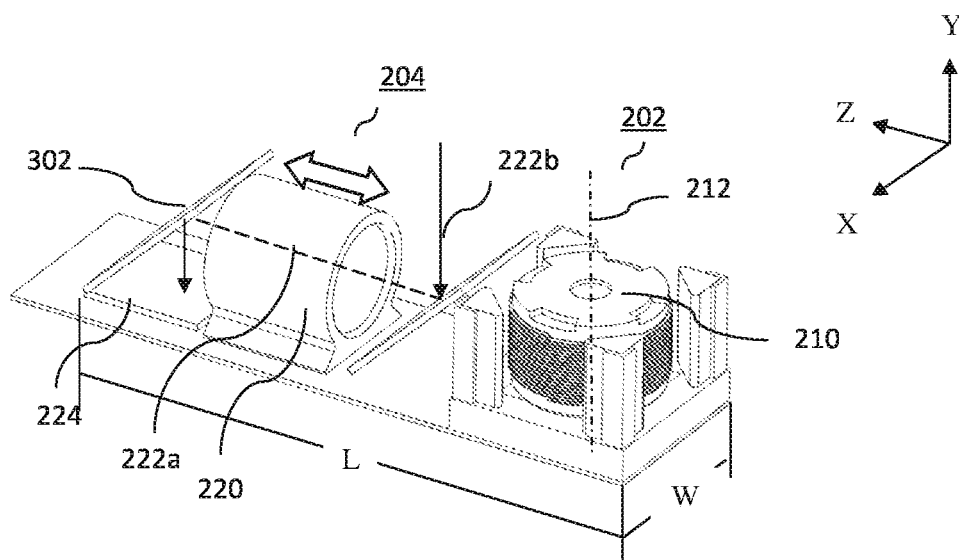
FIGS. 3A and 3B show schematically a zoom and auto-focus dual-aperture camera with folded Tele lens module disclosed herein in (FIG. 3A) a general isometric view, and (FIG. 3B) a side view, according to an example of the presently disclosed subject matter.
Figure 3B:
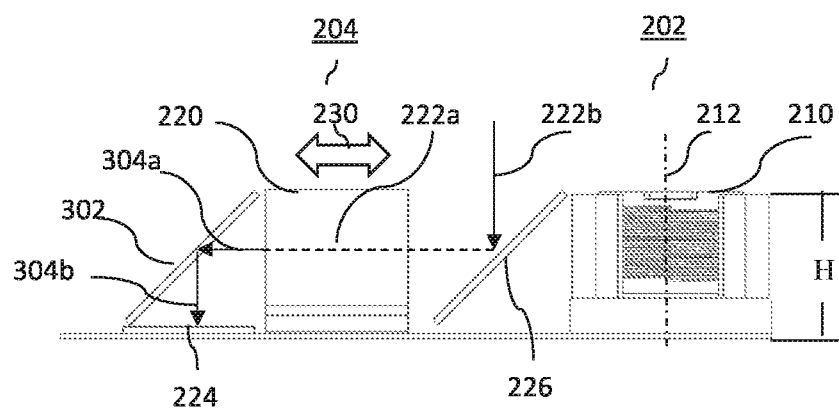

FIGS. 3A and 3B show schematically yet another embodiment of a zoom and auto-focus dual-aperture camera with folded Tele lens disclosed herein and numbered 300 in (FIG. 3A) a general isometric view and (FIG. 3B) a sectioned isometric view. Camera 300 is substantially identical to camera 200, except that camera 300 includes a second mirror 302 inserted in the optical path between the Tele lens and Tele sensor 224, the path marked here by arrows 304a and 304b. In addition, and unlike in cameras 200 and 200' (but as in camera 100), Tele sensor 224 lies in the X-Z plane (same as the Wide sensor). According to one example, the Wide and Tele sensors may be placed on the same substrate, e.g. a PCB. Alternatively, each sensor may be mounted on a separate PCB. Both mirrors can be inclined at substantially 45° to the Tele lens symmetry axis 222a.

As in camera 200, both Wide and Tele sub-cameras may be fixed focus (FF) or auto focus (AF). As in camera 200, an AF mechanism (not shown) is coupled to and operative to move the Tele lens along the Z axis in a direction shown by an arrow 230, i.e. parallel to symmetry axis 222a. Camera 300 may have for example, the same dimensions and/or parameters as camera 200 or be larger (e.g. by about 5-10 mm) along the Z axis.

Camera 300 requires that the Tele lens module is designed such that its back focal length (BFL), i.e. the distance along the optical path from the left hand side of the Tele lens barrel to the mirror, and from there to the Tele image sensor (the combined lengths of arrow 304a and 304b), is large enough to enable the inclusion of the second mirror. In addition, the folded Tele geometry in camera 300 allows direct mounting of the Wide and Tele image sensors on a single common PCB. Alternatively, each sensor may be mounted on a separate PCB. Camera 300 can have for example dimensions and/or parameters shown in Table 1.

Figure 4A:
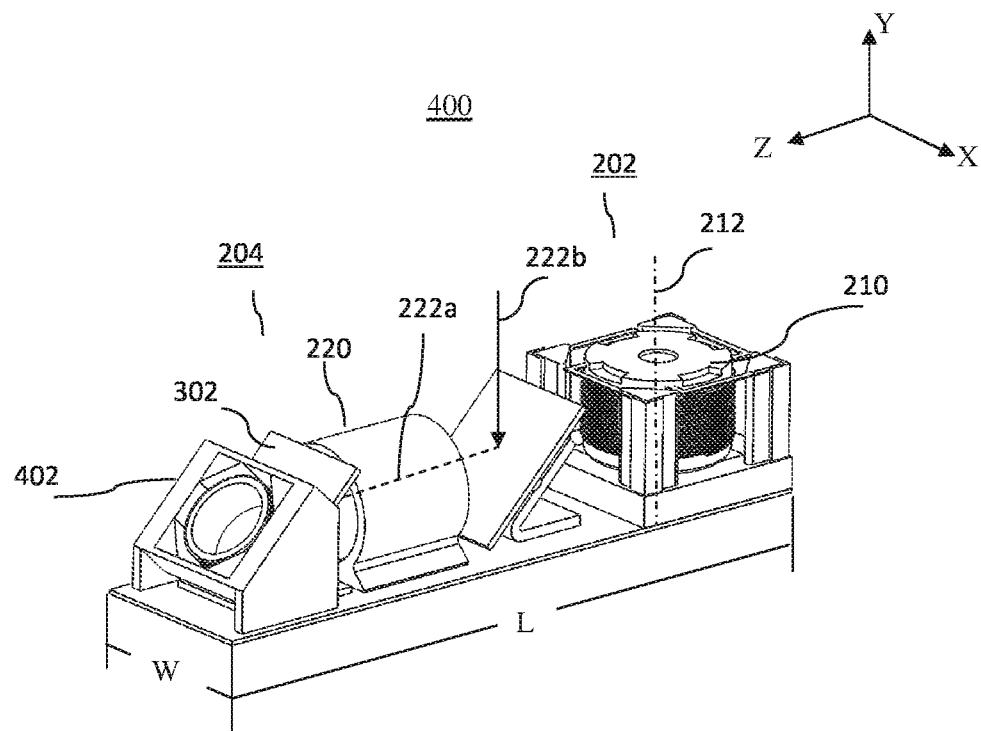
FIGS. 4A and 4B show schematically a zoom and auto-focus dual-aperture camera with folded Tele lens module disclosed herein in (FIG. 4A) a general isometric view, and (FIG. 4B) a side view, according to an example of the presently disclosed subject matter.
Figure 4B:
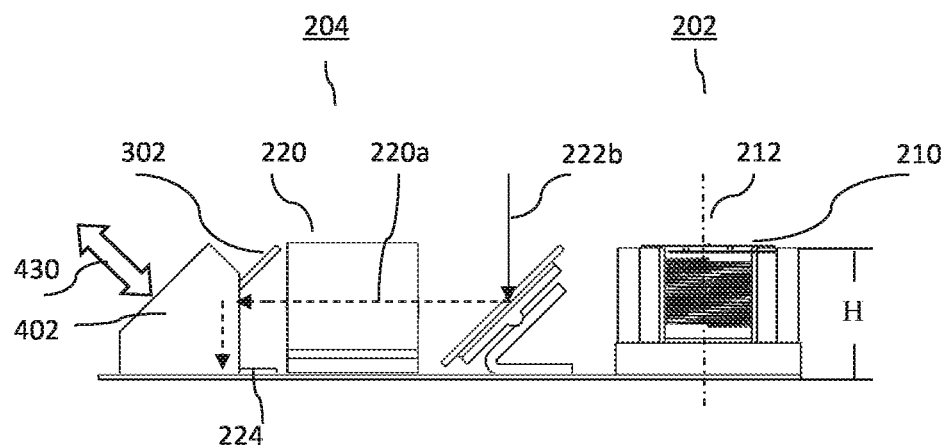

FIGS. 4A and 4B show, schematically, an embodiment of a zoom and auto-focus dual-aperture camera with folded Tele lens disclosed herein and numbered 400 in (FIG. 4A) a general isometric view and (FIG. 4B) a sectioned isometric view. Camera 400 is substantially identical to camera 300, except that the Tele sub-camera is auto-focused by means of moving the second mirror using an AF mechanism (see FIGS. 5A and 5B) 402 coupled thereto. Mechanism 402 moves second mirror 302 in a direction perpendicular to its flat plane (e.g. at 45° to the X-Y and X-Z planes) shown by an arrow 430. The mirror movement range may for example, between 100-500 μm. Alternatively, the second mirror 302 can be moved in other directions to focus the Tele image that is captured by the Tele sensor, for example, along the Z axis or the Y axis. Camera 400 may have for example, dimensions and/or parameters shown in Table 1.

Figure 5A:
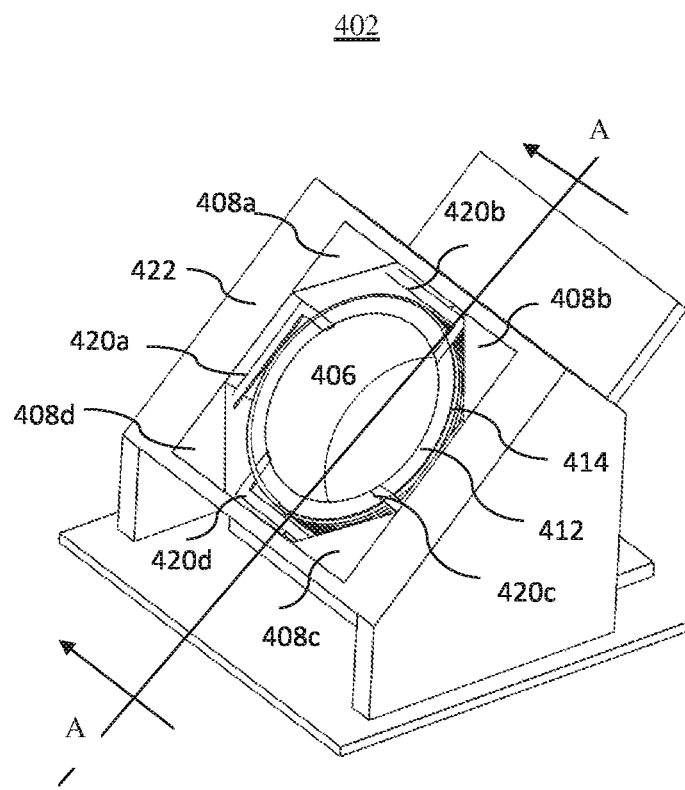
FIGS. 5A and 5B show schematically details of the auto-focus mechanism for moving the second mirror in the example shown in FIGS. 4A and 4B in (FIG. 5A) a general isometric view, and (FIG. 5B) a cross sectional view through section A-A.
Figure 5B:
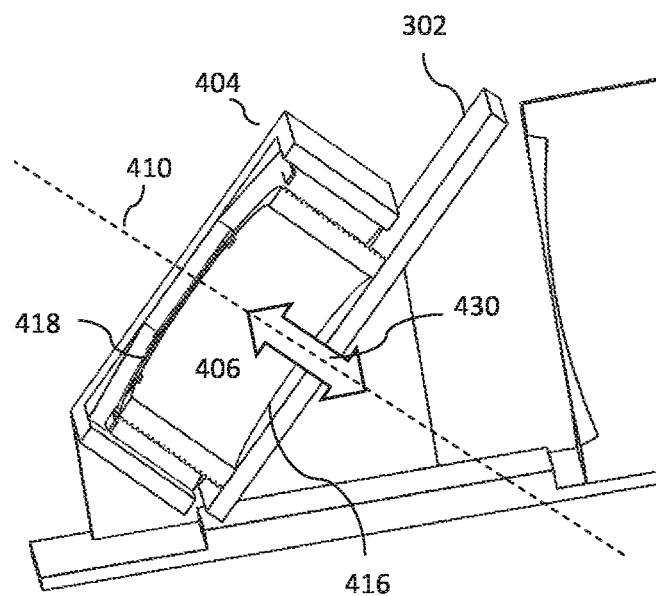

FIGS. 5A and 5B show, schematically, details of mechanism 402 in (FIG. 5A) a general isometric view, and (FIG. 5B) a cross sectional view through section A-A. Mechanism 402 includes an electromagnetic actuator comprising a stationary member 404 and a moving member 406. Stationary member 404 includes four permanent magnets 408a-d. Moving member 406, shown here generally to have a cylindrical shape with a symmetry axis 410 includes a core 412 surrounded at least partially by a coil 414. Moving member 406 is mechanically coupled at one end 416 to mirror 302 and at an opposite end 418 to four springs 420a-d, which in turn are rigidly coupled to a stationary frame 422. The number of springs shown is provided by way of example only, and fewer (e.g. one) or more than four springs can be used. In use, a current passing through coil 414 leads to a magnetic force that causes moving member 406 and mirror 302 to move along symmetry axis 410 as indicated by arrow 430.

Figure 6A:
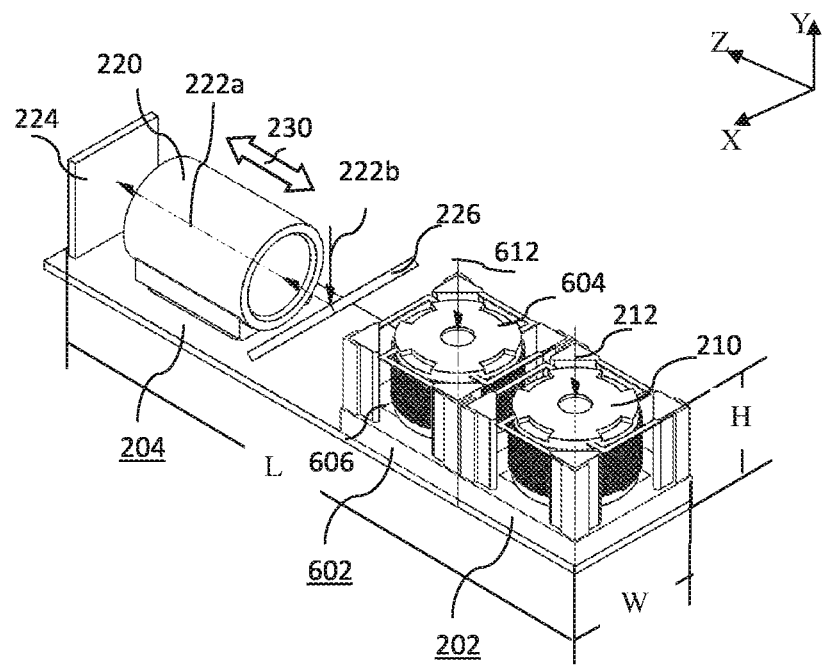
FIG. 6A shows schematically in a general isometric view a zoom and auto-focus triple-aperture camera with one folded Tele lens according to an example of the presently disclosed subject matter.

FIG. 6A shows schematically, in a general isometric view, an embodiment of a zoom and auto-focus triple-aperture camera with one folded Tele lens 600 disclosed herein. Camera 600 includes for example, elements and functionalities of camera 200. That is, camera 600 includes a Wide sub-camera 202 with a Wide lens 210 and a Wide sensor 214, a Tele sub-camera 204 with a folded Tele lens 220, a mirror 226 and an "upright" Tele sensor 224.

In this example, the three sub-cameras are substantially aligned in the Z direction along a common axis. As in camera 200, Tele lens auto-focus is achieved by moving the Tele lens along the Z axis in a direction shown by arrow 230. However, in addition to the elements of camera 200, camera 600 further includes a second Tele (referred to as "Mid" or "M") sub-camera 602 with a Mid lens 604 and a Mid sensor 606. Mid sub-camera 602 has an $EFL_M$ and a $FOV_M$ intermediate to those of the Wide and Tele sub-cameras, (see examples in Table 1). A symmetry (and optical) axis 612 of the Mid sub-camera is substantially parallel to axis 212 of Wide sub-camera 202 and direction 222b in Tele sub-camera 204. Note that while the Wide and Mid sub-cameras are shown in a particular arrangement (with Mid sub-camera 602 closer to Tele sub-camera 204), this order may be changed such that the Wide and Mid sub-cameras exchange places. Camera 600 may have for example, dimensions and/or parameters shown in Table 1.

In use, an output FOV of camera 600 (as well as camera 600', 600'', 700 and 800) is defined by a zoom factor ZF. Such an FOV may be marked "$FOV_{ZF}$". For example, in zoom-in up to a $ZF=ZF_M$ the camera output is the same as the output of a dual-aperture zoom camera with only Wide and Mid sub-cameras, where the Mid sub-camera replaces the Tele sub-camera. When zooming in from $ZF_M$ to $ZF_T$ the camera output is the same as the output of a dual-aperture zoom camera with only Mid and Tele sub-cameras, where the Mid sub-camera replaces the Wide sub-camera. This provides a "continuous zoom" (i.e. resolution gain vs. ZF) experience. A more detailed explanation of the term "continuous zoom" as used herein, and an example of a continuous zoom experience obtained with a camera disclosed herein, are provided with respect to FIG. 8.

Figure 6B:
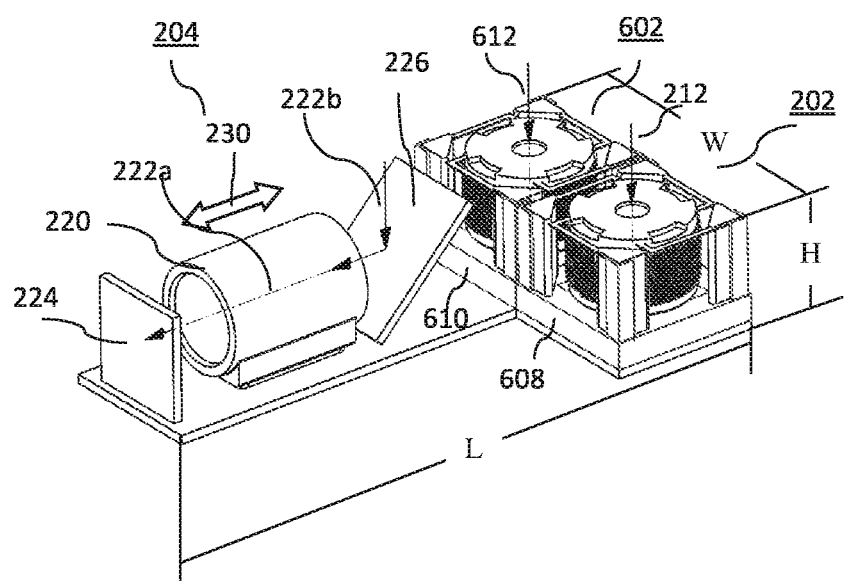
FIG. 6B shows schematically in a general isometric view a zoom and auto-focus triple-aperture camera with one folded Tele lens, according to an example of the presently disclosed subject matter.

FIG. 6B shows schematically, in a general isometric view, another embodiment of a zoom and auto-focus triple-aperture camera with one folded Tele lens disclosed herein and numbered 600'. Camera 600' includes essentially the same elements as camera 600, but the Wide and Mid sub-cameras are aligned along the Z direction, while the Tele sub-camera has the Z direction as its symmetry axis. As in camera 600, the positions of the Wide and Mid sub-cameras are interchangeable. Camera 600' may have for example dimensions and/or parameters shown in Table 1.

Figure 6C:
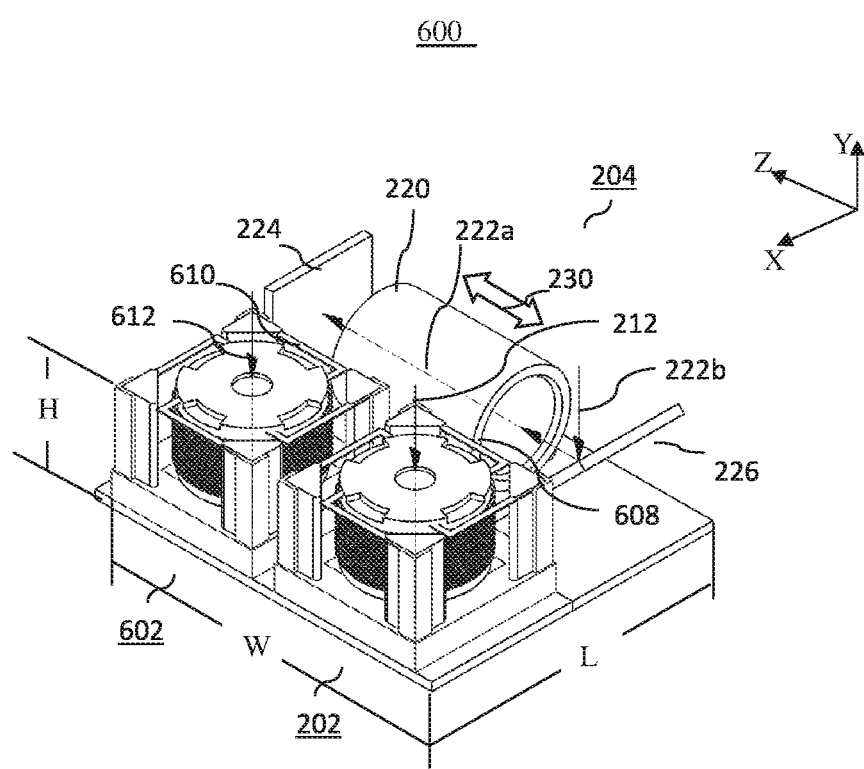
FIG. 6C shows schematically in a general isometric view a zoom and auto-focus triple-aperture camera with one folded Tele lens according to an example of the presently disclosed subject matter.

FIG. 6C shows schematically, in a general isometric view, yet another embodiment of a zoom and auto-focus triple-aperture camera with one folded Tele lens disclosed herein and numbered 600''. Camera 600'' includes essentially the same elements as cameras 600 and 600', but the positioning of the three sub-cameras is changed such that the folded Tele lens is adjacent to and parallel to a side 608 of Wide sub-camera 202 and a side 610 of Mid sub-camera 602. As in cameras 600 and 600', the positions of the Wide and Mid sub-cameras are interchangeable. Camera 600'' may have, for example, dimensions and/or parameters shown in Table 1.

Figure 7:
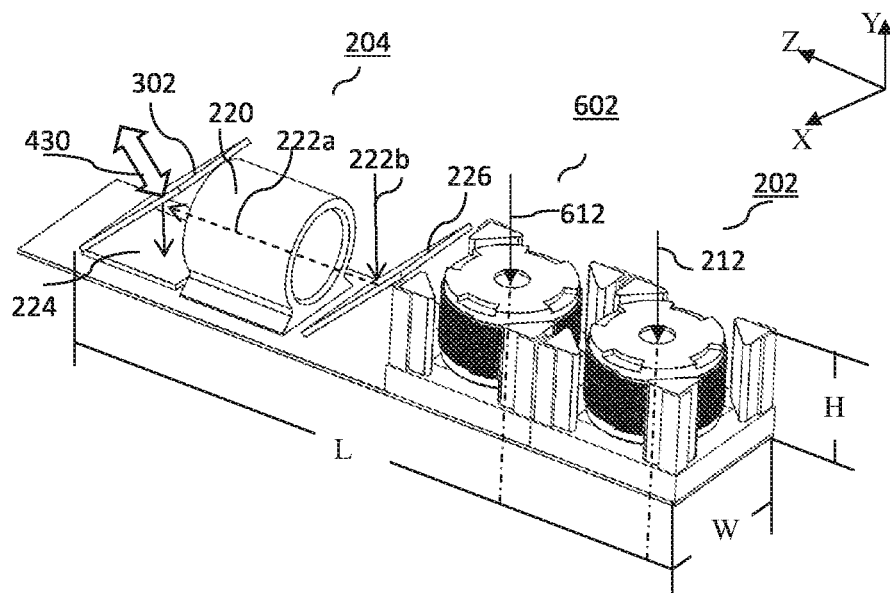
FIG. 7 shows schematically in a general isometric view a zoom and auto-focus triple-aperture camera with two folded lenses, according to an example of the presently disclosed subject matter.

Note that while the triple-aperture camera with one folded Tele lens embodiments of FIGS. 6A-C are shown as including an "upright" Tele sensor 224, other triple-aperture cameras with one folded Tele lens embodiments may include a second mirror and a Tele sensor positioned in the X-Z plane as in camera 300. One such embodiment is shown in FIG. 7. FIG. 7 shows schematically, in a general isometric view, yet another embodiment of a zoom and auto-focus triple-aperture camera with one folded Tele lens disclosed herein and numbered 700. Camera 700 may be seen essentially as a camera in which a Mid sub-camera 602 is added to the elements of camera 300. Alternatively, it can be seen as a camera in which a second mirror 302 is inserted in the optical path between folded Tele lens 220 and Tele sensor 224. Tele auto-focus may be achieved by (as shown by arrow 430) moving second mirror 302 (as in camera 400), or, alternatively, by moving the Tele lens (as in camera 300). Camera 700 may have for example, dimensions and/or parameters shown in Table 1.

Figure 8:
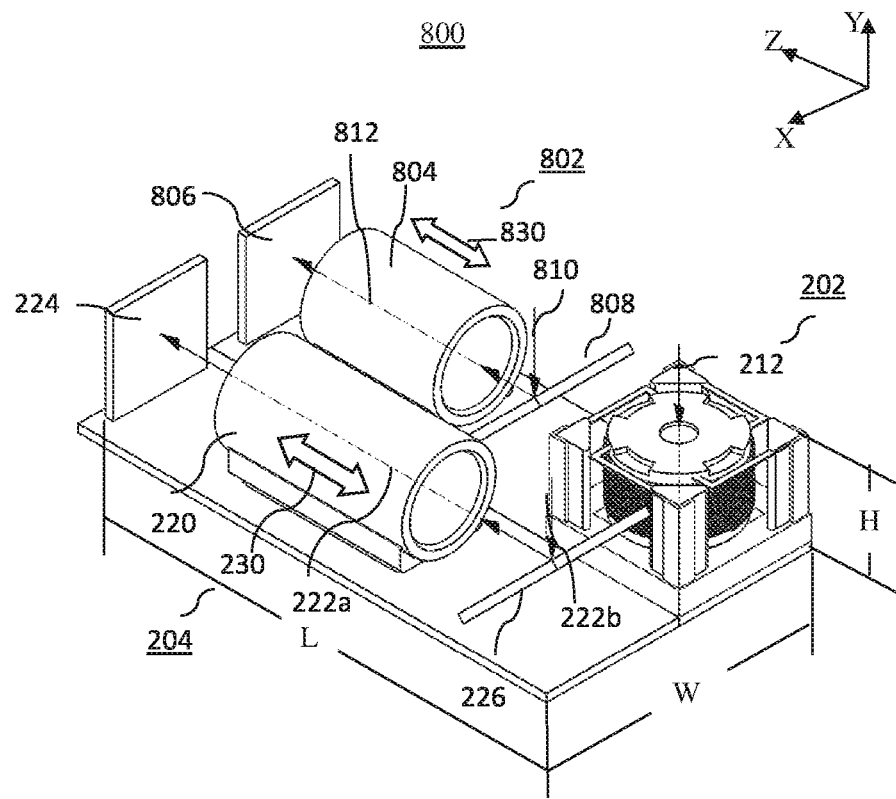
FIG. 8 shows schematically in a general isometric view a zoom and auto-focus triple-aperture camera with two folded Tele lenses, according to an example of the presently disclosed subject matter.

FIG. 8 shows schematically, in a general isometric view, an embodiment of a zoom and auto-focus triple-aperture camera with two folded lenses disclosed herein and numbered 800. Camera 800 may be seen as combining elements existing in camera 200 with an added "folded" Mid sub-camera 802. Thus, as in camera 200, camera 800 may include a Wide sub-camera 202 with a Wide lens and Wide sensor, a Tele sub-camera 204 with a folded Tele lens, an upright Tele sensor 224, and a mirror 226. Folded Mid sub-camera 802 includes a Mid lens 804 and an upright Mid sensor 806. An added mirror 808 reflects radiation arriving from the object side in a direction 810 which is parallel to direction 222b and axis 212, through Mid lens 804 to the Mid sensor along a Mid lens symmetry axis 812, thus providing Mid image data which may be combined with Wide and Tele sub-cameras image data. In some examples, mid lens 804 may be moved by an AF mechanism (not shown) along its axis 812 in the Z direction (the movement illustrated by an arrow 830) to provide Mid autofocus, similar to the Tele autofocus movement illustrated above by arrow 230.

Alternative embodiments (not shown) of a camera with folded Mid and Tele lenses may include additional mirrors and "flat" Mid and Tele sensors (similar to embodiments shown in FIGS. 3A and 3B, 4A and 4B and 7 for the Tele lens). Furthermore, according to this example, autofocus may be achieved by moving these mirrors instead of the lenses. Camera 800 may have for example, dimensions and/or parameters shown in Table 1. This configuration of camera 800 enables for example $EFL_M=3*EFL_W$ and $EFL_T=9*EFL_W$ while maintaining a camera height of less than 7 mm.

Figure 9A:
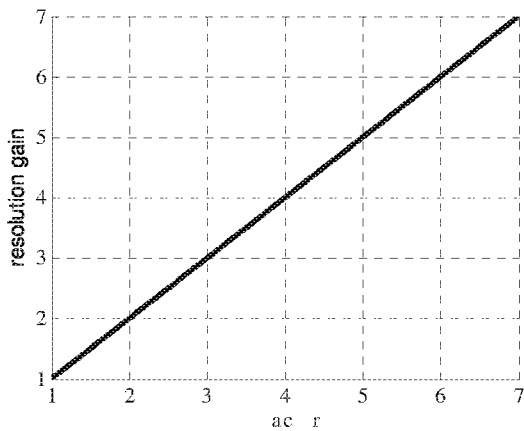
Figure 9B:
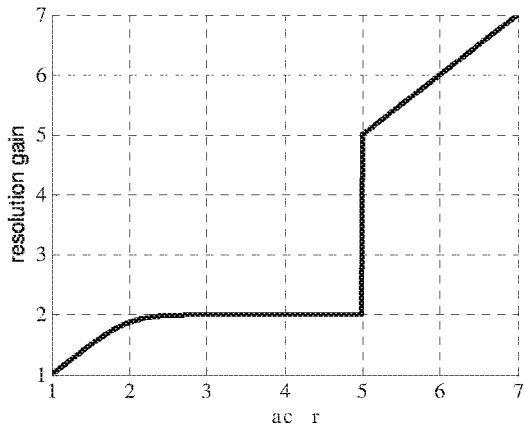

FIG. 9A illustrates the user experience of resolution gain vs ZF in an ideal optical zoom case. FIG. 9B illustrates the actual user experience of resolution gain vs ZF in a common case of two 13 Mega (13M) pixel sub-cameras (one Wide and one Tele) and a 2 Mega (2M) pixel viewer (e.g. display).

For example, assume the Wide and Tele sub-cameras have $EFL_s$ fulfilling $EFL_T=5*EFL_W$. In this case, the starting resolution (ZF=1) will be the 2 M of the viewer. As ZF increases by sub-camera digital zoom, the viewer 2 M pixels will sample a smaller "new" FOV (contributing to higher resolution). This new FOV is a function of ZF i.e. $FOV_{ZF}=FOV_W/ZF$. The new $FOV_{ZF}$ is sampled by a smaller number of pixels (PXC) in the Wide sub-camera (contributing to lower resolution) according to $PXC=13 M/(ZF)^2$. As long as PXC>2 M (or $ZF<(13/2)^{0.5}$=DZC), the perceived resolution will increase with ZF. For ZF close to 1, the resolution increase will be similar to the resolution increase of an optical zoom. For a digital ZF close to DZC, the resolution increase will be much lower. For a digital ZF>DZC, the resolution will remain constant. A formula describing the resolution gain (RG) achieved by digital zoom of the Wide sub-camera as a function of ZF can be written as:

$$RG=RG(W)*(1+CQ*(ZFC-1)*\mathrm{sqrt}(\tan h(((ZF-1)/CQ*(ZFC-1))^2)))$$

where CQ (typically between 0.7-0.8) represents the camera quality at maximum resolution and RG(W) is the perceived object resolution of a Wide sub-camera image without any digital zoom.

In FIG. 9B, RG follows this formula for 1<ZF<5. At ZF=5 (defined as "transition ZF" or $ZF_t$), the output switches to the T sub-camera with a corresponding RG(T)=5, where RG(T) is the perceived object resolution of a T sub-camera image without any digital zoom. In a similar way, the continued resolution gain with ZF after the sub-camera switch follows:

$$RG=RG(T)*(1+CQ*(DZC-1)*\mathrm{sqrt}(\tan h(((ZF/ZF_T-1)/CQ*(DZC-1))^2)))$$

As can be seen from FIG. 9B, the user experience of resolution gain with ZF is very different than in an ideal optical zoom case.

Figure 9C:
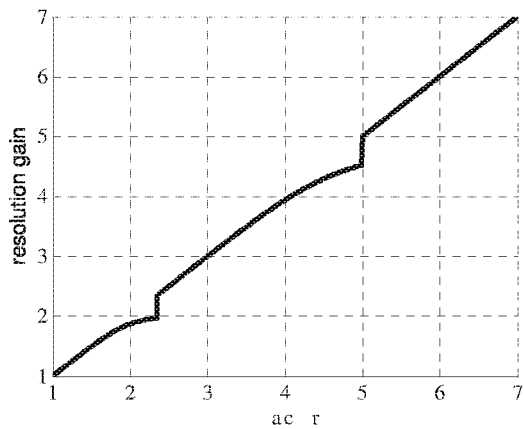

FIG. 9C illustrates a user experience of resolution gain vs. ZF in a common case of 13 M sub cameras and 2 M viewer with a three-aperture camera that includes a Wide sub-camera with $EFL_W$, an intermediate Mid sub-camera with $EFL_M=2.35*EFL_W$, and a Tele sub-camera with $EFL_T=5*EFL_W$. In this case there are two sub-camera transitions $ZF_{t1}=2.35$ and $ZF_{t2}=5$. Correspondingly, there are three resolution gains RG(W)=1, RG(M)=2.35 and RG(T)=5. The figure illustrates the following RG behavior:

From ZF=1 up to ZF=2.35, $RG=RG(W)*(1+CQ*(DZC-1)*\mathrm{sqrt}(\tan h(((ZF/1-1)/CQ*(DZC-1))^2)))$;

From ZF=2.35 up to ZF=5, $RG=RG(M)*(1+CQ*(DZC-1)*\mathrm{sqrt}(\tan h(((ZF/ZF_T1-1)/CQ*(DZC-1))^2)))$; From ZF=5 onwards, $RG=RG(T)*(1+CQ*(DZC-1)*\mathrm{sqrt}(\tan h(((ZF/ZF_{T2}-1)/CQ*(DZC-1))^2)))$.

As can be seen, in this case the user experience of resolution gain vs. ZF is very close to the user experience in an ideal optical zoom.

Thus, according to an example of the presently disclosed subject matter, given an $EFL_W$ and an $EFL_T$, a Mid sub-camera with respective $EFL_M$ can be selected based on the geometric mean of the $EFL_W$ value and an $EFL_T$ value. According to this example, $EFL_M$ is selected based on the equation $=>\sqrt{EFL_T \times EFL_W}$, where in some cases $EFL_M$ equals $\sqrt{EFL_T \times EFL_W}$.

As mentioned above, it is desirable to design a camera having dimensions which are as small as possible in order to be suitable to operate with commonly used image sensors and to fit the thickness of an electronic device (e.g. a Smartphone), in which the camera is installed (preferably without protruding from the device's casing). Accordingly, in a multiple-aperture (e.g. dual-aperture) camera as disclosed herein it is desirable to maintain the height of a folded Tele sub-camera as low as possible. Unlike common cameras (e.g. upright sub-cameras), in a folded Tele sub-camera as disclosed herein the height of the camera is related to the dimension of the module in the y axis as shown for example in FIGS. 2A-C and is largely dependent on the diameter of the largest lens among the lenses in the respective lens module.

At the same time, it is also desirable to achieve good image resolution while providing high zooming effect (e.g. ZF=×5 or greater) and therefore the aperture diameter in the folded Tele sub-camera must be maintained sufficiently large to enable to achieve a sufficiently small F # (e.g. F #=3 or smaller). Notably, the larger the EFL of the Tele sub-camera, the larger the aperture must be to maintain a given F #.

Furthermore, in many conventional lens modules (e.g. upright Wide or Tele lens modules) with a sensor being larger than the aperture, the diameter of the lenses is designed to be increasingly wider towards the sensor so it is adapted to the field angle of light entering the camera aperture, which is intended to fall on the entire area of the sensor. In a folded lens unit, this conventional design of increasing lens diameter would result in a greater camera height and is therefore undesirable.

Thus, a new folded Tele sub-camera is disclosed herein having a lens module with a group of lens elements designed with reduced height while maintaining light blockage below a certain value and allowing projection of incoming light on the entire area of the image sensor.

According to examples of the presently disclosed subject matter, the lens elements in the lens module are not designed with an increasingly larger diameter towards the sensor. Rather, the diameter of each lens element in the lens module of the folded Tele sub-camera is reduced in size. The diameter of each lens is determined to be as small as possible while maintaining sufficient light passage through the lens towards the sensor for obtaining desired camera properties (e.g. resolution and SNR) and enabling to continue and provide an image on the entire area (i.e. active pixel area of the sensor) of the image sensor. The image sensors can be for example, a ⅓" image sensor and a ¼" image sensor.

According to certain examples, the diameter of the largest lens element in the Tele lens module (comprising at least 3 lens elements) substantially does not exceed the diameter of the aperture (218) for allowing light to enter the Tele sub-camera (i.e. Tele sub-camera aperture). Thus, the diameter of the Tele sub-camera aperture can assist to define maximal diameter of the lens elements in the Tele lens module.

According to one example, the diameter of the largest lens element in the Tele lens module is lower than or equal to the diameter of the Tele-sub camera aperture. According to another example, the diameter of the largest lens element in the Tele lens module does not exceed the diameter of the Tele sub-camera aperture by more than 10%. According to another example, the diameter of the largest lens element in the Tele lens module does not exceed the diameter of the Tele sub-camera aperture by more than 5%. According to yet another example, the diameter of the largest lens element in the Tele lens module does not exceed the diameter of the Tele sub-camera aperture by more than 2.5%. Examples of folded Tele sub-camera design parameters according to these principles are described below with reference to FIGS. 10 and 11 and Tables 2-7.

Figure 10A:
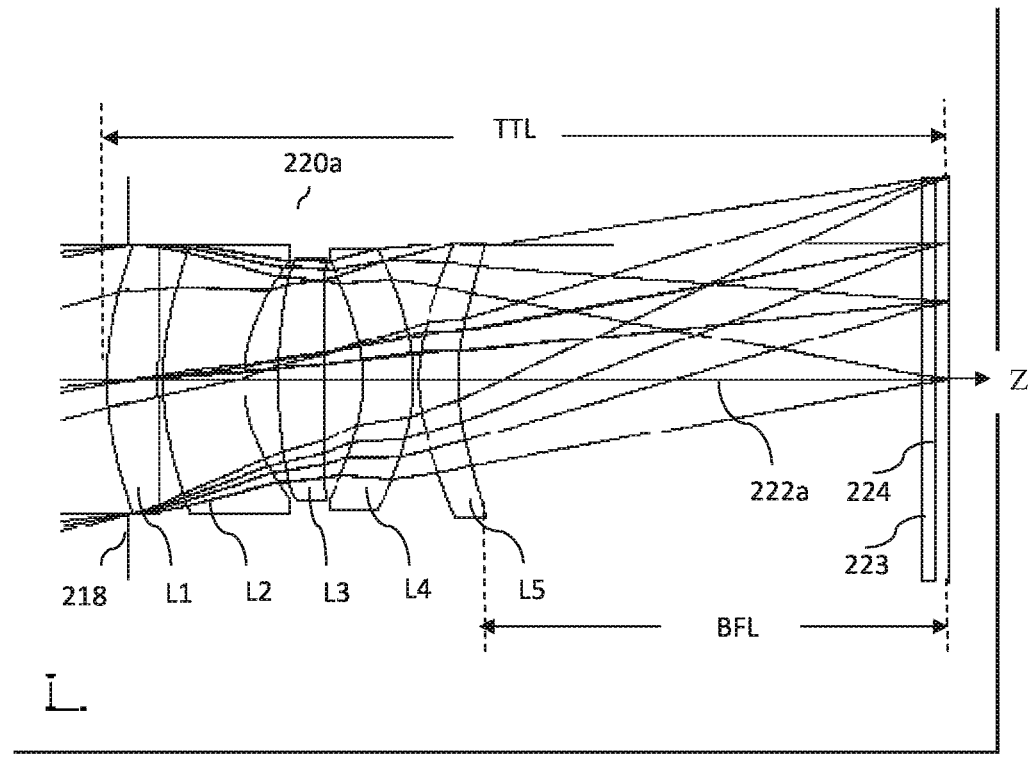
FIG. 10A shows a Tele lens module with a five-element Tele lens unit that can be used in a camera, according to an example of the presently disclosed subject matter.
Figure 10B:
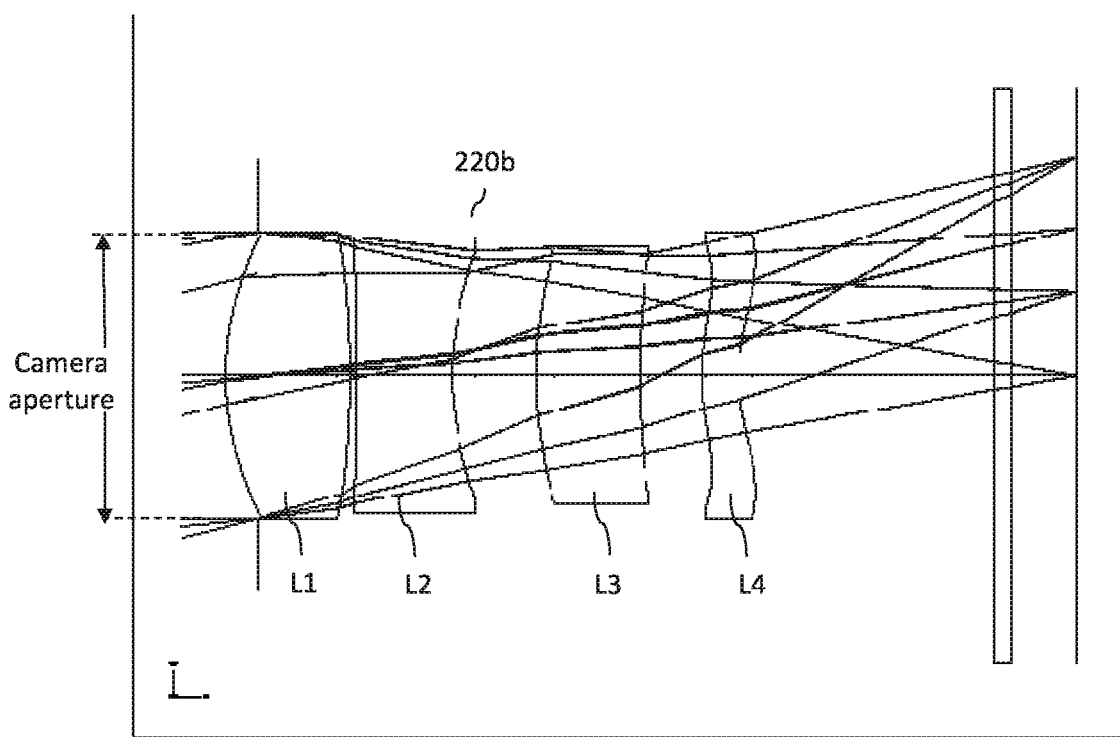
FIG. 10B shows an embodiment of a Tele lens module with a four-element Tele lens unit that can be used in a camera disclosed herein, according to an example of the presently disclosed subject matter.
Figure 10C:
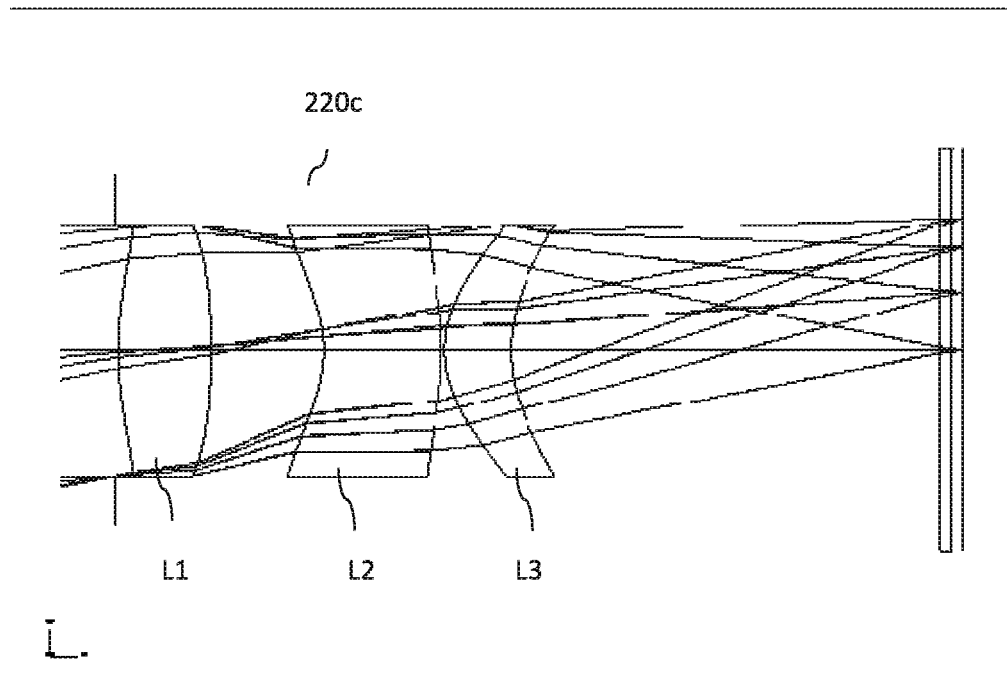
FIG. 10C shows a Tele lens module with a three-element Tele lens unit that can be used in a camera, according to an example of the presently disclosed subject matter.

FIGS. 10A-10C show various exemplary Tele lens modules (numbered 220a, 220b or 220c) that can be used in a zoom dual-aperture camera disclosed herein, including as a folded Tele lens. Each module includes a respective group of lens elements. Also shown in FIG. 10A are aperture stop 218, symmetry axis 222a in a "z" direction, Tele sensor 224 and an additional cover plate 223.

Lens modules 220a, 220b or 220c include, respectively, 5, 4 and 3 lens elements (or simply "elements"). The lens elements are marked L1, L2, L3, L4 and L5 (in lens module 220a), L1, L2, L3 and L4 (in lens module 220b) and L1, L2 and L3 (in lens module 220c). Notably, the examples described herein include at least 3 lens elements which can provide sufficient imaging quality.

Detailed optical data and aspheric surface data is given in Tables 2 and 3 for lens module 220a, in Tables 4 and 5 for lens module 220b, and in Tables 6 and 7 for lens module 220c. The units of the radius of curvature (R), the lens element thickness and/or distances between elements along the symmetry axis, and the diameter are expressed in mm. "$N_d$" is the refraction index. "$V_d$" is a parameter indicating lens material color disparity. A large $V_d$ indicates a small color disparity and vice-versa. "BKZ" is a known glass with a known $N_d$ and $V_d$. The equation of the aspheric surface profiles is expressed by:

$$z = \frac{cr^2}{1 + \sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}.$$

where "r" is distance from (and perpendicular to) the symmetry axis, k is the conic coefficient, c=1/R where R is the radius of curvature, and $\alpha$ are coefficients given in Tables 3, 5 and 7. Note that the maximum value of r, "max r"=Diameter/2. Also note that in Table 2 (and in Tables 4 and 6 below), the distances between various elements (and/or surfaces) are measured on the symmetry axis Z, wherein the stop is at Z=0. Each number is measured from the previous surface.

TABLE 2

| # | Radius (R) | Distance | $N_d/V_d$ | Diameter | Conic coefficient k |
|---|---|---|---|---|---|
| 1 | Infinite | −0.324 | | 4.0 | 0 |
| 2 | 4.938499 | 0.779 | 1.544921/55.9149 | 4.0 | 2.2402 |
| 3 | 53.73119 | 0.074 | | 4.0 | 28 |
| 4 | 4.310708 | 1.217 | 1.635517/23.9718 | 4.0 | 1.2159 |
| 5 | 2.127431 | 0.509 | | 3.5 | −0.9831 |
| 6 | 7.374006 | 0.678 | 1.544921/55.9149 | 3.6 | 10.8851 |
| 7 | −147.731 | 0.604 | | 3.5 | −12.2 |
| 8 | −2.28889 | 0.742 | 1.635517/23.9718 | 3.5 | −7.6686 |
| 9 | −2.97793 | 0.082 | | 3.9 | −5.7863 |
| 10 | 2.411553 | 0.6 | 1.544921/55.9149 | 4.1 | −6.0953 |
| 11 | 3.111521 | 6.982 | | 4.0 | −8.4191 |
| 12 | Infinite | 0.21 | BK7 | 6.0 | 0 |
| 13 | Infinite | 0.187 | | 6.0 | 0 |
| 14 | Infinite | 0 | | 6.1 | 0 |

TABLE 3

| # | $\alpha_1$ | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|
| 2 | 0 | −2.5699E−03 | −6.5546E−04 | −2.4933E−05 | −1.9717E−05 | 9.1450E−07 | 1.8986E−08 | 0.0000E+00 |
| 3 | 0 | 4.7508E−04 | −4.3516E−04 | −6.5166E−05 | −4.2148E−07 | 1.0572E−06 | 4.4021E−08 | 0.0000E+00 |
| 4 | 0 | −9.1395E−03 | 2.5655E−04 | −4.5210E−05 | 7.4472E−06 | −1.1011E−06 | 2.8410E−07 | 0.0000E+00 |
| 5 | 0 | −1.0827E−02 | 1.0372E−03 | 5.0554E−05 | −9.5710E−06 | 1.1448E−05 | −2.2474E−06 | 0.0000E+00 |
| 6 | 0 | −9.5074E−03 | 1.0268E−03 | 2.4209E−04 | 1.1234E−04 | 3.9355E−06 | −9.7194E−06 | 7.9430E−07 |
| 7 | 0 | −3.6269E−03 | 8.7662E−04 | 7.0010E−04 | 6.5578E−05 | −2.0053E−05 | −4.1923E−06 | 0.0000E+00 |
| 8 | 0 | −1.2355E−02 | 1.8611E−03 | 1.5007E−04 | −9.4899E−05 | −8.0223E−06 | −3.1794E−06 | 0.0000E+00 |
| 9 | 0 | −7.3112E−03 | 9.3354E−04 | 2.5951E−06 | −4.0614E−06 | −8.8752E−06 | −1.6836E−06 | 6.2706E−07 |
| 10 | 0 | −2.7777E−03 | 7.1318E−04 | 3.0673E−05 | −2.3126E−06 | −2.9513E−06 | 5.1524E−07 | 0.0000E+00 |
| 11 | 0 | −3.8232E−03 | 4.8687E−04 | 4.8505E−05 | 2.2064E−06 | −4.0755E−06 | 5.8813E−07 | 0.0000E+00 |

TABLE 4

| # | Radius | Distance | $N_d/V_d$ | Diameter | Conic coefficient k |
|---|--------|----------|-----------|----------|---------------------|
| 1 | Infinite | −0.420 | | 4.0 | |
| 2 | 4.114235 | 1.674 | 1.544921/55.9149 | 4.0 | −0.6679 |
| 3 | −14.5561 | 0.073 | | 4.0 | 15.3789 |
| 4 | 76.19695 | 1.314 | 1.635517/23.9718 | 3.9 | −10.0000 |
| 5 | 3.726602 | 1.130 | | 3.6 | −0.3699 |
| 6 | 5.336503 | 1.407 | 1.635517/23.9718 | 3.8 | −9.4625 |
| 7 | 9.356809 | 0.839 | | 3.6 | −12.2000 |
| 8 | 2.76767 | 0.512 | 1.544921/55.9149 | 3.8 | −3.0862 |
| 9 | 2.342 | 3.457 | | 4.0 | −2.3717 |
| 10 | Infinite | 0.210 | BK7 | 8.0 | |
| 11 | Infinite | 0.894 | | 8.0 | |
| 12 | Infinite | 0.000 | | 8.0 | |

TABLE 5

| # | $\alpha_1$ | $\alpha_2$ | $\alpha_3$ | $\alpha_4$ | $\alpha_5$ | $\alpha_6$ | $\alpha_7$ |
|---|-----|-----|-----|-----|-----|-----|-----|
| 2 | 0 | 3.1365E−04 | −2.4756E−04 | −3.2950E−05 | −3.1474E−06 | −6.6837E−07 | −9.3198E−08 |
| 3 | 0 | 1.1887E−03 | −5.1479E−04 | −7.0886E−06 | −6.6567E−06 | 7.3082E−07 | −2.1508E−07 |
| 4 | 0 | −6.7467E−03 | 1.6492E−03 | −1.7937E−04 | 2.4668E−05 | −6.1495E−08 | −5.8827E−07 |
| 5 | 0 | −1.8460E−02 | 3.8467E−03 | −5.0388E−04 | 9.0675E−05 | 6.3951E−06 | −4.2041E−06 |
| 6 | 0 | −1.0557E−03 | 5.4851E−04 | −1.1124E−04 | 1.2112E−04 | −1.4549E−05 | −1.0474E−06 |
| 7 | 0 | −1.3355E−02 | 7.1465E−03 | −1.8536E−03 | 4.1411E−04 | −8.4044E−06 | −6.4049E−06 |
| 8 | 0 | −5.9360E−02 | 6.4070E−03 | 4.1503E−04 | −2.5533E−04 | 4.3694E−05 | −5.0293E−06 |
| 9 | 0 | −5.6451E−02 | 9.0603E−03 | −5.9225E−04 | −1.1000E−04 | 2.2464E−05 | −1.5043E−06 |

TABLE 6

| # | Radius | Distance | $N_d/V_d$ | Diameter | Conic coefficient k |
|---|--------|----------|-----------|----------|---------------------|
| 1 | Infinite | 0.060 | | 5.0 | 0.00 |
| 2 | 7.942 | 1.682 | 1.534809/55.6639 | 5.0 | −7.2579 |
| 3 | −15.778 | 2.040 | | 5.0 | 17.1752 |
| 4 | −2.644 | 2.143 | 1.639078/23.2529 | 5.0 | −5.3812 |
| 5 | −7.001 | 0.063 | | 5.0 | −8.3079 |
| 6 | 2.300 | 1.193 | 1.534809/55.6639 | 5.0 | −0.5654 |
| 7 | 3.373 | 7.787 | | 5.0 | −0.1016 |
| 8 | Infinite | 0.210 | BK7 | 8.0 | |
| 9 | Infinite | 0.200 | | 8.0 | |

TABLE 7

| # | $\alpha_1$ | $\alpha_2$ | $\alpha_3$ | $\alpha_4$ | $\alpha_5$ | $\alpha_6$ | $\alpha_7$ |
|---|-----|-----|-----|-----|-----|-----|-----|
| 2 | 0 | −3.4545E−04 | −2.6977E−04 | −6.3091E−06 | −7.6965E−07 | 0.0000E+00 | 0.0000E+00 |
| 3 | 0 | −1.2414E−03 | −3.0118E−04 | 1.6812E−05 | −1.6865E−06 | 1.9446E−07 | −1.1391E−08 |
| 4 | 0 | 3.0073E−03 | −4.8811E−04 | 9.4948E−05 | −5.7587E−06 | 1.0543E−07 | 0.0000E+00 |
| 5 | 0 | 3.6847E−03 | −4.8608E−04 | 7.2121E−05 | −2.9304E−06 | 0.0000E+00 | 0.0000E+00 |
| 6 | 0 | −1.5774E−02 | 1.4580E−03 | −2.6302E−04 | 2.3905E−05 | −1.1017E−06 | 0.0000E+00 |
| 7 | 0 | −8.6658E−03 | 1.2548E−03 | −3.6145E−04 | 5.0797E−05 | −3.8486E−06 | 1.1039E−07 |

Figure 11A:
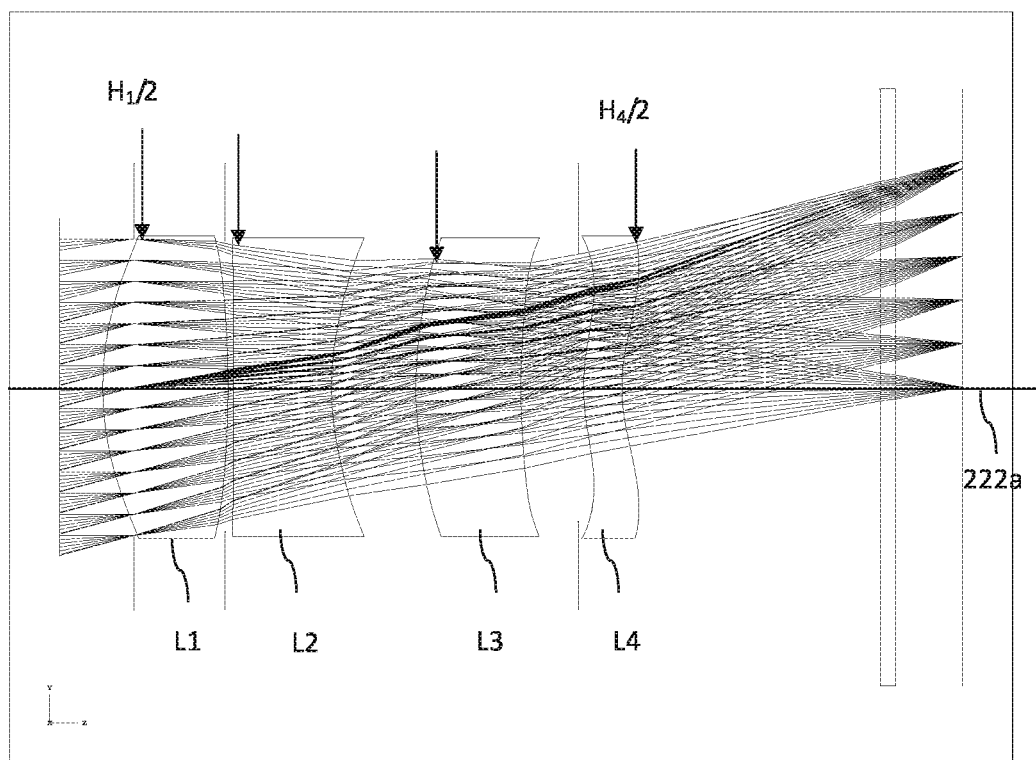
FIG. 11A illustrates the term "lens optical height" H/2 for each lens element of a four-element lens unit, according to an example of the presently disclosed subject matter.

The following terms are defined: "Lens optical height" "H" is the maximal diameter of the optically used area of each lens element, i.e. the area through which light passes directly from the camera aperture to the sensor to form an image. The term is illustrated in FIG. 11A for a four-element lens module. Each element $L_n$ has a respective optical height "H.". The figure shows H/2 as the distance between the symmetry axis and the tip of marked arrows. The "camera optical height" is the largest optical height out of all lens elements, in this case Hi.

Figure 11B:
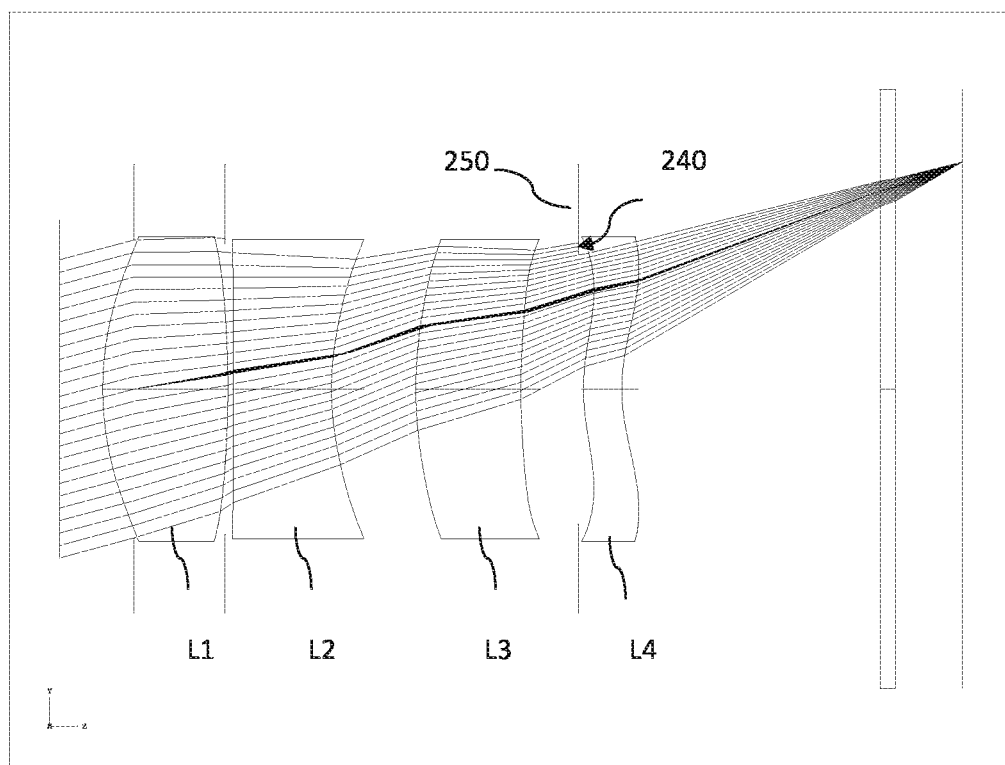
FIG. 11B illustrates the effect of blocked light according to an example of the presently disclosed subject matter.

A "blocked light percentage" (per viewing angle) is defined as the percentage of light arriving at the camera from a very far object at a certain viewing angle (horizontal and vertical) and which enters the camera aperture but does not reach the image sensor. Notably, the relative light blockage increases with a decrease in the diameter of the lens elements. FIG. 11B illustrates a blockage 240 of part of the light caused by a light stop 250 inserted (by way of example) between elements L3 and L4 of a four-element Tele lens. Light stop, also known simply as "stop", is configured to prevent light from reaching the lens edge and being scattered in all directions.

According to the presently disclosed subject matter, the diameter of the lens elements in the Tele lens module are determined such that light which is blocked by light stops does not prevent more than a predefined percentage of the incoming light from reaching the image sensor.

The Tele lenses disclosed above allow the use of a large Tele sensor (>4.5 mm×3.35 mm) enabling high pixel count (e.g. 13 Mega pixels). They provide a low camera optical height that enables a low camera module height (e.g. <1.25* (1+EFL/F #)=1.25*(1+ camera aperture)), see also FIGS. 12A and 12B and FIGS. 13A and 13B.

The folded Tele lenses disclosed herein allow a long EFL (e.g. >10 mm) for high zoom, a low F # (e.g. <3) to obtain more light and optical resolution, and a low percentage of blocked light (<25%) for all viewing angles. As shown above, a folded Tele lens module may include, for example, 3-5 lens elements. This combination of lens elements enables to obtain a high image quality at a low price.

It is noted that the lens elements of the Tele lens module are held in place by a special structure (e.g. barrel), for example by a plastic tub (cold barrel). Thus, the Tele lens module discussed herein is considered to include the structure holding the lens elements in place (barrel) as well as a substrate (e.g. one or more PCBs). The one or two magnets can be positioned on the substrate as illustrated in FIGS. 12A and 12B and FIGS. 13A and 13B or on the sides of the substrates. In any case their height substantially does not exceed the height of the Tele lens module.

Figure 12A:
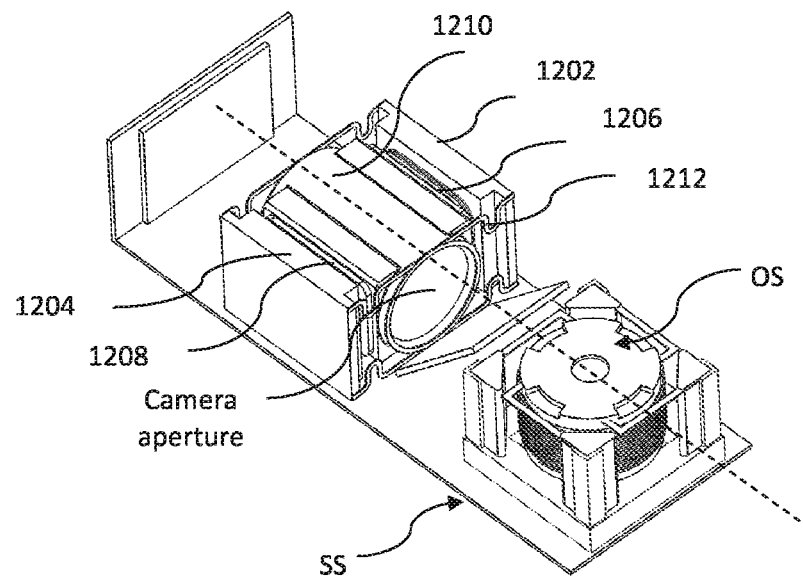
FIGS. 12A and 12B show schematically in (FIG. 12A) an isometric view and in (FIG. 12B) an external view of a camera module, according to an example of the presently disclosed subject matter.
Figure 12B:
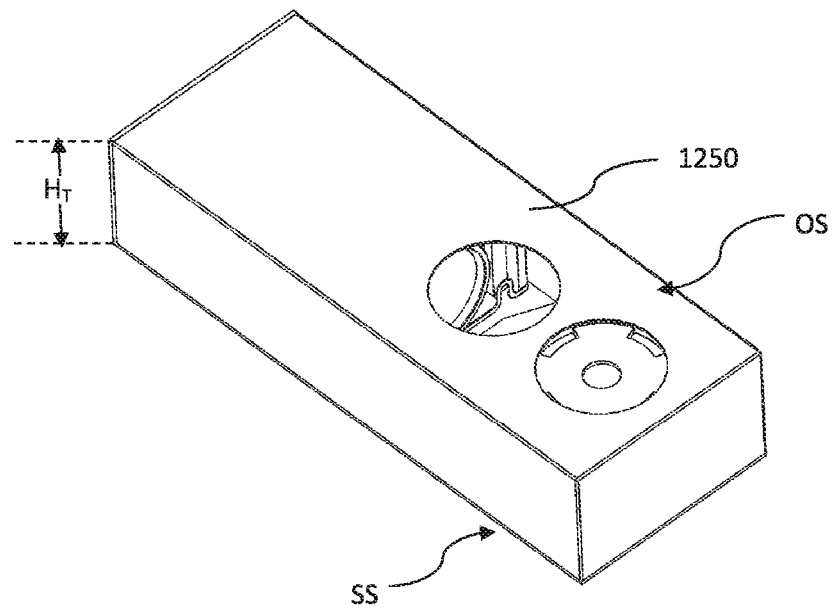

FIGS. 12A and 12B show in (FIG. 12A) an isometric view and in (FIG. 12B) an external view of a camera disclosed herein and numbered 1200. Camera 1200 includes a two-magnet (1202 and 1204), two-coil (1206 and 1208) AF mechanism for the folded Tele lens. Each pair of magnet-coils is disposed so as to provide a force that moves a Tele lens 1210 along its symmetry axis. The force (and movement) are countered (and reversed) by a spring 1212.

Figure 13A:
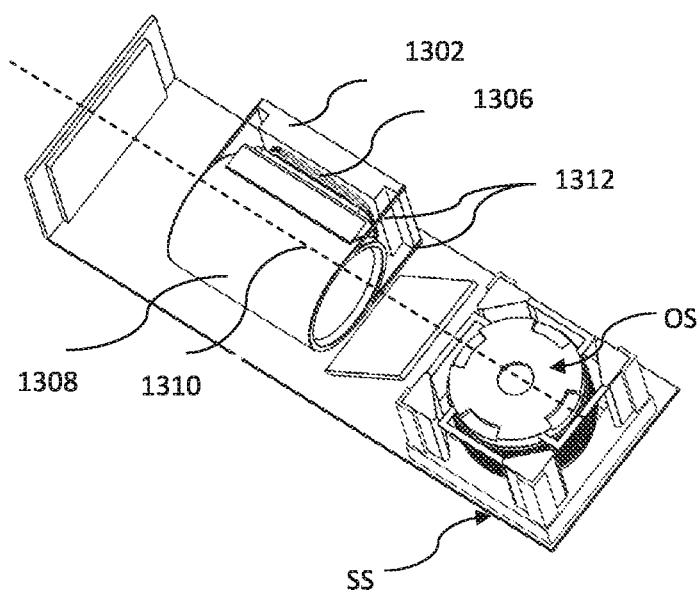
FIGS. 13A and 13B show schematically in (FIG. 13A) an isometric view and in (FIG. 13B) an external view of another camera module, according to an example of the presently disclosed subject matter.
Figure 13B:
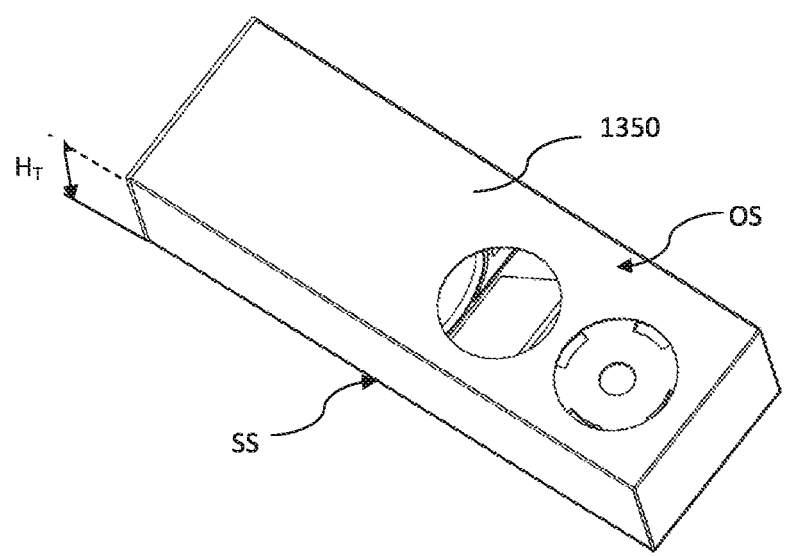

FIGS. 13A and 13B show in (FIG. 13A) an isometric view and in (FIG. 13B) an external view of a camera disclosed herein and numbered 1300. In contrast with camera 1200, camera 1300 includes a one-magnet (1302), one-coil (1306) and spring (1312) AF mechanism for the folded Tele lens. AF mechanisms illustrated in FIGS. 12A and 12B and FIGS. 13A and 13B are configured to operate according to the principles of voice coil actuator (VCA, commonly known as "magnetic actuators").

This AF mechanism is specifically designed to maintain a low camera profile. According to one example, the AF mechanism is designed to fit laterally on one or two faces of the Tele lens module, while the other faces remain clear of the AF mechanism parts.

Specifically, one or two magnets (coupled magnetically to respective coils) are designed with a height substantially not exceeding the height of the Tele lens module in order to avoid any significant contribution to the overall height of the Folded Tele sub-camera.

This design is illustrated in FIGS. 12A and 12B (showing an AF design with two magnets) and FIGS. 13A and 13B (showing an AF design with one magnet). Note that while the magnets are positioned upright on one or two sides of the Tele lens module, the two other plains (on the object side, marked by arrow OS, and substrate side, marked by arrow SS), located perpendicular to the magnets, remain clear of the magnets. This design of the AF mechanism in general and the magnets, specifically significantly reduces (or, in some configurations, completely avoids) an increase in the overall height of the Tele sub-camera which may have been otherwise induced by the AF mechanism.

According to one example, the height of the magnets is lower than or equal to the height of the Tele lens module (defined for example by the highest lens). According to another example, the height of the magnets does not exceed the height of the Tele lens module by more than 10%. According to another example, the height of the magnets does not exceed the height of the Tele lens module by more than 5%. According to another example, the height of the magnets does not exceed the height of the Tele lens module by more than 2.5%.

The entire camera (including the AF mechanism) may be packaged in a low profile mechanical packaging (casing) 1250 with height HT (height total), see FIG. 12B, enabling inclusion of a zoom dual or triple aperture camera disclosed herein in a low profile cell-phone, such that HT is equal to or smaller than 6.5 mm and in some examples equal to or smaller than 5.7.

Figure 14:
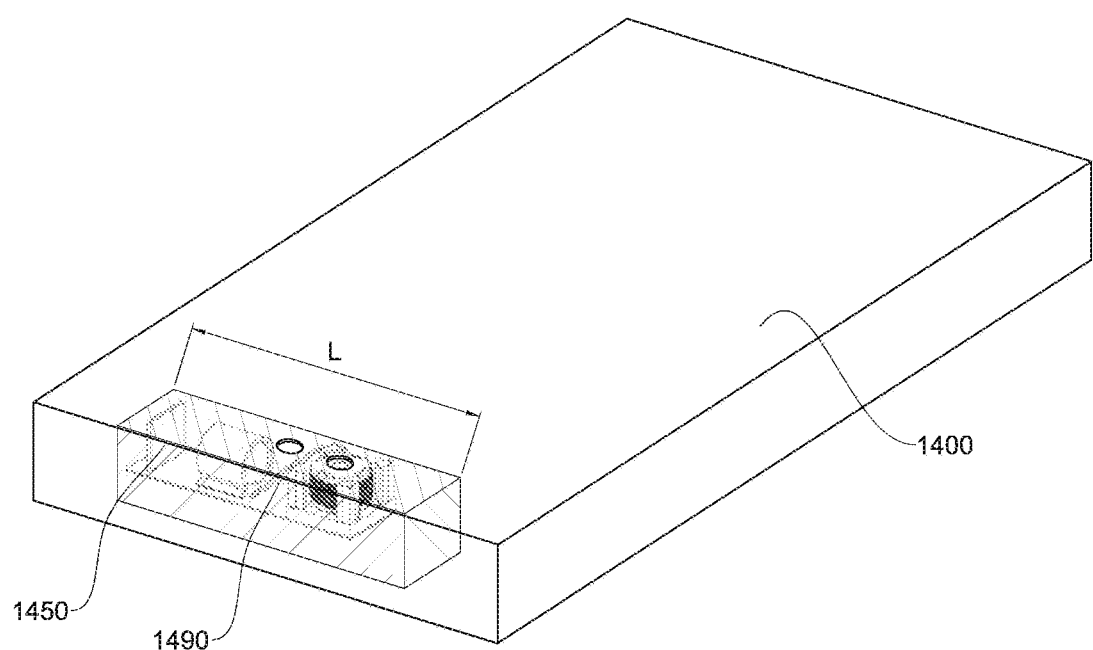
FIG. 14 shows schematically a portable electronic device with an integrated dual-aperture camera with folded Tele lens module, according to an example of the presently disclosed subject matter.

FIG. 14 shows a schematic illustration of an example of a portable electronic device with an integrated dual-aperture camera with folded Tele lens module, according to an example of the presently disclosed subject matter. As illustrated in the image, the camera 1450 (including dual aperture camera with folded Tele lens module and the camera casing) is fully integrated in the portable electronic device 1400 and does not protrude from the device casing. The camera is oriented within the portable device such that its longitudinal dimension is positioned horizontally with respect to the device. Due to the folded optical path of the Tele sub-camera it can provide a high zooming effect (e.g. ×5 or greater) while having a structure not protruding from the casing of the electronic device (e.g. Smartphone).

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A multi-camera, comprising:
   a first camera comprising a first aperture, a first lens module, and a first image sensor, wherein the first lens module has a first lens symmetry axis along an optical path between an object and the first image sensor, and wherein the first image sensor lies in a first sensor plane; and
   a second camera comprising a second aperture, a second lens module with a plurality of lens elements, a second image sensor, one or more reflecting elements comprising at least a first reflecting surface and a last reflecting surface, and wherein the second image sensor lies in a second sensor plane,
   wherein the first camera has a first field-of-view FOV1,
   wherein the second camera has a second field-of-view FOV2<FOV1,
   wherein respective heights of the first and second cameras are each smaller than 10 mm,
   wherein the plurality of lens elements of the second camera includes a first lens element closest to an object side with a first lens element aperture larger or equal than an aperture of any other lens element of the second lens module,
   wherein the first and last reflecting surfaces of the second camera are arranged such that the first reflecting surface is more proximate to the second aperture and the last reflecting surface is more proximate to the second sensor,
   wherein the first reflecting surface and the last reflecting surface are parallel and operative to provide an optical path between the object and the second image sensor,
   wherein the first sensor plane and the second sensor plane are parallel to each other, and both are substantially perpendicular to the first lens symmetry axis, and
   wherein the first reflecting surface of the second camera is closer to the first aperture than the last reflecting surface of the second camera.

2. The multi-camera of claim 1, wherein the first sensor plane and the second sensor planes are identical.

3. The multi-camera of claim 2, wherein the first image sensor and the second image sensor are placed on a single printed circuit board.

4. The multi-camera of claim 1, wherein the first sensor plane and the second sensor planes are not identical.

5. The multi-camera of claim 4, wherein the first image sensor and the second image sensor are placed on separate printed circuit boards.

6. The multi-camera of claim 1, wherein the second camera is an auto-focus camera.

7. The multi-camera of claim 6, wherein the last reflecting surface is operative to be moved to perform the auto-focus.

8. The multi-camera of claim 1, wherein both the first camera and the second camera are auto-focus cameras.

9. The multi-camera of claim 8, wherein the last reflecting surface is operative to be moved to perform the auto-focus of the second camera.

10. The multi-camera of claim 1, wherein the second camera has a camera width W in the range of 5-12 mm and a cameral length L in the range of 20-50 mm.

11. The multi-camera of claim 1, further comprising a processor configured to output video output images with a smooth transition when switching between a lower zoom factor (ZF) value and a higher ZF value or vice versa, by using information that includes first camera and second camera white balance or exposure time to reduce changes in color or brightness upon the smooth transition and by using image pixel information to reduce parallax artifacts.

12. A multi-camera, comprising:
a first camera comprising a first aperture, a first lens module, and a first image sensor, wherein the first lens module has a first lens symmetry axis along an optical path between an object and the first image sensor, and wherein the first image sensor lies in a first sensor plane; and
a second camera comprising a second aperture, a second lens module with a plurality of lens elements, a second image sensor, one or more reflecting elements comprising at least a first reflecting surface and a last reflecting surface, wherein the second image sensor lies in a second sensor plane,
a third camera comprising a third lens module and a third image sensor,
wherein the first camera has a first field-of-view FOV1,
wherein the second camera has a second field-of-view FOV2,
wherein the third camera has a third FOV3,
wherein FOV2<FOV3<FOV1 or FOV2<FOV1<FOV3,
wherein respective heights of the first, second and third cameras are each smaller than 10 mm,
wherein the plurality of lens elements of the second camera includes a first lens element closest to an object side with a first lens element aperture larger or equal than an aperture of any other element of the second lens module,
wherein the first and last reflecting surfaces of the second camera are arranged such that the first reflecting surface is more proximate to the second aperture and the last reflecting surface is more proximate to the second sensor,
wherein the first reflecting surface and the last reflecting surface are parallel and operative to provide an optical path between the object and the second image sensor,
wherein the first sensor plane and the second sensor plane are substantially perpendicular to the first lens symmetry axis, and
wherein the first reflecting surface of the second camera is closer to the first aperture than the last reflecting surface of the second camera.

13. The multi-camera of claim 12, wherein the first sensor plane and the second sensor planes are identical.

14. The multi-camera of claim 13, wherein the first image sensor and the second image sensor are placed on a single printed circuit board.

15. The multi-camera of claim 12, wherein the first sensor plane and the second sensor planes are not identical.

16. The multi-camera of claim 15, wherein the first image sensor and the second image sensor are placed on separate printed circuit boards.

17. The multi-camera of claim 12, wherein the second camera is an auto-focus camera.

18. The multi-camera of claim 17, wherein the last reflecting surface is operative to be moved to perform the auto-focus.

19. The multi-camera of claim 12, wherein both the first camera and the second camera are auto-focus cameras.

20. The multi-camera of claim 19, wherein the last reflecting surface is operative to be moved to perform the auto-focus of the second camera.

21. The multi-camera of claim 12, wherein the second camera has a camera width W in the range of 5-12 mm and a cameral length L in the range of 20-50 mm.

22. The multi-camera of claim 12, further comprising a processor configured to output video output images with a smooth transition when switching between a lower zoom factor (ZF) value and a higher ZF value or vice versa, by using information that includes first camera and second camera white balance or exposure time to reduce changes in color or brightness upon the smooth transition and by using image pixel information to reduce parallax artifacts.

* * * * *